United States Patent [19]

Wells, Jr. et al.

[11] 4,414,671
[45] Nov. 8, 1983

[54] COLLISION LASER

[75] Inventors: William E. Wells, Jr.; S. Douglas Marcum, both of Oxford; Lawrence W. Downes, Fairfield, all of Ohio; Richard A. Tilton, San Diego, Calif.

[73] Assignee: Miami University, Oxford, Ohio

[21] Appl. No.: 308,714

[22] Filed: Oct. 5, 1981

[51] Int. Cl.³ .............................................. H01S 3/09
[52] U.S. Cl. ........................................ 372/73; 372/74; 372/55; 372/70; 372/68
[58] Field of Search ...................... 372/73, 89, 55, 68, 372/69, 70, 74

[56] References Cited

U.S. PATENT DOCUMENTS 4,091,336  5/1978  Miley et al. ............................ 372/73
4,110,703  8/1978  Jalufka et al. ......................... 372/73

OTHER PUBLICATIONS

"Autoionization of $N_2$", by Duzy et al., J. Chem. Phys., vol. 64, No. 6, Mar. 15, 1976.

*Primary Examiner*—James W. Davie
*Assistant Examiner*—Leon Scott, Jr.
*Attorney, Agent, or Firm*—Philip M. Dunson

[57] ABSTRACT

Electromagnetic radiation (10) is provided in a gas mixture (12) including helium in the X(1) state and nitrogen in the Y(1) state. The helium is pumped to excite a high population density of its atoms from the X(1) state to the X(2) state; and photons (15) of suitable frequency are injected into the mixture (12) to excite, via a three-body radiative collision of an atom of X(2) with a molecule of Y(1) and a photon (15): a high population density of molecules of the nitrogen from the Y(1) state to the Y(3) state, followed by a substantially simultaneous return of a substantial portion of the excited helium atoms to the X(1) state and a substantial depopulation of the Y(3) state of the nitrogen, causing the molecules thereof to drop to the lower energy Y(2) state, thereby stimulating the emission from the nitrogen of two photons (10) at the same wavelength for each absorbed photon (15), and thus providing a total quantity of photon emission (10) with sufficient gain for amplification of electromagnetic radiation (10), and finally resulting in the depopulation of the molecules in the Y(2) state by autoionization.

33 Claims, 16 Drawing Figures a. Absorption
b. Stimulated emission

COLLISION LASER

The Government has rights in this invention pursuant to Contract No. DASG60-78-C-0089 awarded by Ballistic Missile Defense System Command.

FIELD

This invention relates to methods and apparatus for providing stimulated emission of electromagnetic radiation. Typical embodiments of the invention comprise laser amplifiers and laser oscillators.

The invention is especially advantageous as a new type of laser amplification system, based on a process of stimulated emission radiative collisions. The system produces a high population density of long lived excited atoms that, in a three-body collision with a suitable atom or molecule in its ground state and with a photon of appropriate energy, results in photon emission with sufficient gain for laser amplification.

The invention typically uses the photon induced collision between a metastable excited atom or molecular species and a ground-state molecule, to which metastable energy is transferred with high efficiency, simultaneously stimulating the emission of two photons at the same wavelength for each absorbed photon. The gain of the system depends upon an inversion of the *products* of the population densities of atomic or molecular states. The term "density" as used herein always means *number* density (unless the context shows otherwise) regardless of whether the density is of state population, or of collisions.

The invention comprises a novel way to provide inversions, in that energy can be stored in one atom species in the upper laser levels, whereas the lower levels of the other atom or molecule of the collision pair can be depopulated as by a rapid decay mechanism. When this principle is applied to a system in which a high density of upper level states is populated, while at the same time the lower level is rapidly depopulated, the gain and efficiency are significant, and conditions can be realized to provide a high power, high energy laser amplifier.

Hereinafter described in more detail is a new type of laser based on radiative collisions, with a specific gas selection, namely He-$N_2$, as a typical embodiment. Gain in such a system can be described by the equation $$\text{Gain} = \frac{d\rho}{\rho dz} = \hbar\omega k\{[g_{X(2)}g_{Y(1)} [X(2)][Y(1)] - g_{Y(2)} g_{X(1)} [Y(2)][X(1)]]\},$$

which is dealt with in detail later. For a given situation, when the numerical value of this equation is positive, amplification of a light signal can take place through stimulated emission.

To date, lasers have required a population inversion within a single species. The analysis hereinafter shows that laser gain can be obtained by the inversion of the product of two densities, rather than just the individual densities. This is also shown in the equation above.

Such inversions are usually not possible for systems of atomic or molecular species in thermal equilibrium. This invention provides specific means by which it is possible to produce the inversion of product population density.

The typical embodiment comprising a mixture of He and $N_2$ is described by the equation

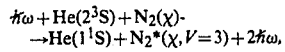
$$\hbar\omega + He(2^3S) + N_2(\chi) \rightarrow He(1^1S) + N_2^*(\chi, V=3) + 2\hbar\omega,$$

where $He(2^3S)$ represents the excited helium atoms produced in the gas mixture by the pumping source; $N_2(X)$, the nitrogen molecules in their initial ground state; $He(1^1S)$, the ground-state helium atom products of the 3-body collision; and $N_2^*(X,v=3)$, the product nitrogen molecules remaining after stimulated emission has occurred. As seen in the equation above, to achieve gain in the system the product densities in the right-hand term of the equation must be low. In the present invention, this has been unexpectedly achieved by taking advantage of the fact that the $N_2^*(X,v=3)$ molecule, which is still in an excited state with a high population density, is an autoionizing state with a very short lifetime. It self-destructs rapidly, thereby depleting its population and making the first product density of the right-hand term negligible.

BACKGROUND

In 1972, Gudzenko and Yakovlenko[1] described a process involving, effectively a three-body collision between atomic or molecular species X and Y, and a photon $\hbar\omega$. FIG. 1a shows the energy level for atoms X and Y that corresponds to $$X(1) + Y(2) + \hbar\omega \rightarrow X(2) + Y(1) \tag{1}$$

The absorption of the photon, having an energy $h\omega$, allows a resonant two-body collision.

The production rate of state X(2) can be written $$\frac{d[X(2)]}{dt} = k\rho \, [X(1)] \, [Y(2)], \tag{2}$$

where [] indicates concentration, $\rho$ is the photon flux field and k is a three-body rate coefficient for the radiative collision. If we look at $k\rho$ in terms of a normal binary collision, then $$k\rho = <\sigma v>, \tag{3}$$

where $\sigma$ is the event cross section and v is the velocity, thus (2) becomes $$\frac{d[X(2)]}{dt} = <\sigma v> [X(1)] [Y(2)]. \tag{4}$$

Alternatively, if we look at k in terms of photon absorption, then $$k[Y(2)] = B_{12}, \tag{5}$$

where $B_{12}$ is an Einstein-like absorption coefficient. Now (2) can be written as $$\frac{d[X(2)]}{dt} = B_{12} \rho \, [X(1)]. \tag{6}$$

When cast in the form of a collision, as in (3) and (4), the cross section $\sigma$, becomes a function of $\rho$, the photon flux field. When written in the form of a radiative absorption, as in (5) and (6), the Einstein stimulated absorption coefficient, $B_{12}$, becomes a function of the density, [Y(2)]. The photon, $\hbar\omega$ does not have the energy of the difference between X(2) and X(1), but approximately the energy difference between X(2) and Y(2). A third method of describing these collisions would be the absorption of a photon by a quasi-molecule or collision complex Y(2)X(1). This model is conceptually useful.

Harris[2] has used the collisional model to describe his observations of many such collisions that he and his colleagues have observed. In this work very large cross sections have been observed for a wide variety of collisions induced by intense photon flux fields. The largest cross section reported thus far is $8 \times 10^{-13} cm^2$.[2] Harris[4] and others[5] have used these large cross sections to propose population mechanisms for lasers.

We propose a stimulated emission process based on the inverse process to (1). This process was considered briefly in reference 1.

$$\hbar\omega + X(2) + Y(1) \rightarrow X(1) + Y(2) + 2\hbar\omega \qquad (7).$$

For this reaction, the colliding atoms are stimulated to emit a photon, (FIG. 1b), where in reaction (1) the colliding atoms are stimulated to absorb a photon. The cross section for these two reactions, (1) and (7), are the same; thus the rate of production will be the difference between the two processes $$\frac{d[X(2)]}{dt} = k\rho \{[X(1)][Y(2)] - [X(2)][Y(1)]\}. \qquad (8)$$

The photon production rate $$-\frac{d[X(2)]}{dt}(\hbar\omega) = \frac{d\rho}{dz} \qquad (9)$$

is the negative part of (8). If the statistical weights are included, then the gain in photon flux can be expressed as $$\text{Gain} = \frac{d\rho}{\rho dz} = \qquad (10)$$

$$\hbar\omega k \{g_{X(2)}g_{Y(1)}[X(2)][Y(1)] - g_{X(1)}g_{Y(2)}[X(1)][Y(2)]\}.$$

Note that the gain of such a system depends on an inversion of the products of the densities. This provides new ways to produce inversions, for the energy storage can be in one species for the upper quasi-molecular laser level and the lower level can be deactivated in the collision partner. At high photon flux fields, a large cross section typical of Harris' data[2] would force the radiative collision to be the chief energy pathway, making the photon production efficiency approach the quantum efficiency. At lower photon flux fields, the energy is channeled through other processes and the efficiency would be expected to be very low. As an example helium and nitrogen are chosen as the media. Although better systems may exist, the abundance of atomic and molecular data for helium and nitrogen makes this example useful.

The energy level diagram for helium and nitrogen in FIG. 2 can be correlated to that of FIG. 1 by, $X(1) \rightarrow He(1^1S),$
$X(2) \rightarrow He(2^3S),$
$Y(1) \rightarrow N_2(x, v = 0),$
$Y(2) \rightarrow N_2^*(x, v = 3),$ and
$Y(3) \rightarrow N_2^*(B, v = 4).$ Note that the * denotes excitation to a Rydberg state near the ionization threshold of nitrogen. This depresses the energy of the B core, v=4, $N_2$ state to resonance with $He(2^3S)$. The reaction of interest now becomes $$He(2^3S) + N_2 + \hbar\omega \rightarrow He + N_2^*(x, v = 3) + 2\hbar\omega. \qquad (11)$$

Because the Rydberg electron is near the ionization limit (in or near the Saha region), the Y(3), $N_2^*(B,v=4)$, state is resonant with $He(2^3S)$. Also, the induced transition can be considered in the same manner as the equivalent ionic state. The Franck-Condon factor[7] shows that the transition 3538 Å is optimal for reaction (11).

Harris[3] has derived an expression for the cross section of a dipole-quadrupole radiative collision for both strong and weak photon flux field regimes. Using this expression for the helium-nitrogen system, we get $$\sigma_{weak} = \left(\frac{\pi^3}{2\hbar^2 \bar{v}^2}\right) \left(\frac{3\mu_{21}^{N_2^*} q_{12}^{He}}{2\rho_0^2}\right)^2 \left(\frac{\mu_{23}^{N_2^*}}{2\hbar\Delta\omega}\right)^2 E^2 \qquad (12)$$

and $$\sigma_{strong} = \pi \left\{ \left(\frac{\pi}{\hbar\bar{v}}\right) \left(\frac{3\mu_{21}^{N_2^*} q_{12}^{He}}{2}\right) \left(\frac{\mu_{23}^{N_2^*}}{2\hbar\Delta\omega}\right) \right\}^{\frac{2}{3}} E^{\frac{2}{3}}. \qquad (13)$$

The dipole matrix element, $\mu_{21}$, $(N_2 \rightarrow N_2^*(B,v))$, is determined by the energy[6] and the Franck-Condon factor[7]. The matrix element, $\mu_{23}$, $(N_2^*(B,v) \rightarrow N_2^*(x, v-1))$, is weighted by the Franck-Condon factor[7]. The quadrupole matrix element, $q_{12}$, $(He(1^3S) \rightarrow He(2^3S))$, is estimated from the equivalent singlet lifetime assuming electron exchange during the collision. The Weisskopf radius[8] is $\rho_0$, $\Delta\omega$ is the detuning energy (normally the energy difference between the virtual state and the real state), $\bar{v}$ is the thermal velocity, and E is the electric field due to the photon flux.

Since the Rydberg state is effectively in the Saha continuum, the detuning energy, $\Delta\omega$, is taken to be a collection of the linewidths of the three states and the bandwidth of the incoming photon flux field. The value of the detuning energy is estimated to be 2 cm$^{-1}$. FIG. 3 shows the limiting case cross sections calculated for (11) as a function of photon flux field, for both the strong and weak photon field cases. A model has been developed for a helium-nitrogen system using the cross section shown in FIG. 3.

The rate equations used in this system involve the concentrations of $He^+$, $He_2^+$, $He(2^3S)$, and $N_2^+$.

The rate of He production is determined by the source terms involving S, the power deposition and the W value or energy investment per ion, and metastable-metastable ionization, $He(2^3S) + He(2^3S) \rightarrow He^+ + He + e$. The loss terms involve charge exchange, $N_2 + He^+ \rightarrow N_2^+ + He$, and three-body conversion, $2He + He^+ \rightarrow He_2^+ + He$. The equation for $He^+$ production is $$\frac{d[\text{He}^+]}{dt} = S + \frac{\beta}{2}[\text{He}(2^3S)]^2 - k_1[N_2][\text{He}^+] - k_2 p_{He}^2[\text{He}^+]. \quad (14)$$

The coefficients are listed in Table 1.
The $\text{He}_2^+$ rate equation is given by $$\frac{d[\text{He}_2^+]}{dt} = k_2 p_{He}^2[\text{He}^+] - \alpha[\text{He}_2^+][e] - \quad (15)$$

$$k_{30}[N_2][\text{He}_2^+] - k_{31}[N_2][\text{He}_2^+][\text{He}].$$

The single source term is three-body conversion, while the loss terms involve collisional radiative recombination, $\text{He}_2^+ + e + x \rightarrow CRR$, and two- and three-body charge transfer, $N_2 + \text{He}_2^+ \rightarrow N_2^+ + 2\text{He}$ and $N_2 + \text{He}_2^+ + \text{He} \rightarrow N_2^+ + 3\text{He}$. See Table 1 for the coefficients of this rate equation.

The metastable production rate has two source terms, one dependent on the energy deposition and the other dependent on collisional radiative recombination. The loss terms depend on metastable-metastable ionization, two- and three-body Penning ionization, $N_2 + \text{He}(2^3S) \rightarrow N_2^+ + \text{He} + e$ and $N_2 + \text{He}(2^3S) + \text{He} \rightarrow N_2^+ + 2\text{He} + e$, and super=elastic relaxation, $\text{He}(2^3S) + e \rightarrow \text{He} + e$ (20 eV). Other losses involve three-body conversion to molecular metastable, $\text{He}(2^3S) + 2\text{He} \rightarrow \text{He}_2(2^3\Sigma) + \text{He}$, spontaneous emission of a photon by a radiative collision, $N_2 + \text{He}(2^3S) \rightarrow N_2 + \text{He} + \hbar\omega$, and stimulated emission from a radiative collision, $N_2 + \text{He}(2^3S) + \hbar\omega \rightarrow N_2(x,v) + \text{He} + 2\hbar\omega$. The rate equation for $\text{He}(2^3S)$ is $$\frac{d[\text{He}(2^3S)]}{dt} = S_m + .7\alpha[\text{He}_2^+][e] - \beta[\text{He}(2^3S)]^2 - \quad (16)$$

$$k_{40}[N_2][\text{He}(2^3S)] - k_{41}[N_2][\text{He}(2^3S)][\text{He}] - k_5[\text{He}(2^3S)][e] -$$

$$\beta_2 p_{He}^2[\text{He}(2^3S)] - A'[N_2][\text{He}(2^3S)] - <\sigma'\bar{v}>[N_2][\text{He}(2^3S)].$$

TABLE 1

$T_e$ = electron temperature, $T_o$ = plasma temperature, $n_e$ = electron density, $n_o$ = neutral density, $p_{He}$ = partial pressure of helium.

| RATE COEFFICIENT | VALUE USED | REFERENCE |
|---|---|---|
| $\beta$ | $1.8 \times 10^{-9}$ cm$^3$/sec | 9 |
| $k_1$ | $1.2 \times 10^{-9}$ cm$^3$/sec | 10 |
| $k_2$ | $67.0 \pm 5$ Torr$^{-2}$/sec | 11,12 |
| $\alpha$ | $4.5 \times 10^{-20}(T_e/T_o)^{-4}n_e$ + $5.0 \times 10^{-27}(T_e/T_o)^{-1}n_o$ cm$^3$/sec | 12 |
| $k_{30}$ | $1.1 \times 10^{-9}$ cm$^3$/sec | 13 |
| $k_{31}$ | $1.6 \times 10^{-29}$ cm$^6$/sec | 13 |
| $S_m$ | $S/0.56$ | 14 |
| $k_{40}$ | $6.9 \times 10^{-11}$ cm$^3$/sec | 15 |
| $k_{41}$ | $2.9 \times 10^{-30}$ cm$^6$/sec | 15 |
| $k_5$ | $7.0 \times 10^{-11}(T_e)^{\frac{1}{2}}$ cm$^3$/sec | 16 |
| $\beta_2$ | $0.3$ Torr$^{-2}$/sec | 17 |
| $A'$ | $8\pi h v^3 \sigma' \bar{v}/\rho c^2$ | Einstein Coefficient |
| $\bar{v}$ | $2.5 \times 10^5$ cm/sec | Thermal Velocity |
| $\alpha_{N_2^+}$ | $2.2 \times 10^{-7}$ cm$^3$/sec | 18 |

Coefficients for equation (16) are also defined in Table 1.
The ionized molecular nitrogen rate equation is $$\frac{d[N_2^+]}{dt} = k_1[\text{He}^+][N_2] + k_{30}[\text{He}_2^+][N_2] + \quad (17)$$

$$k_{31}[\text{He}_2^+][N_2][\text{He}] + k_{40}[\text{He}(2^3S)][N_2] + k_{41}[\text{He}(2^3S)][N_2][\text{He}] +$$

$$A'[\text{He}(2^3S)][N_2] + <\sigma'\bar{v}>[\text{He}(2^3S)][N_2] - \alpha_{N_2^+}[N_2^+][e].$$

All the source terms have been defined previously and the loss term involves dissociative recombination, $N_2^+ + e \rightarrow N_2^* + N$. The rate coefficients are given in Table 1.

Finally, a charge balance equation is used to conserve the system's charge.

These equations have been solved in steady state for power depositions between 200 W/cm$^3$ and 2 MW/cm$^3$ in a mixture of one atmosphere of helium and various percentages of nitrogen. The data presented here is for a mixture with 1% nitrogen.

The gain for the preceding system is calculated from equation (10). It should be emphasized that the $N_2^*(x,v=3)$ state is autoionizing[19] and has a lifetime of about $10^{-10}$ seconds. This makes the product density, $[\text{He}(1^1S)][N_2^*(x,v=3)]$, negligible since the lower levels self-destruct. The calculated gain is shown in FIG. 4. The decrease in gain at the higher photon flux fields is due to the high destruction rate of helium metastables, the effects of which are shown in FIG. 5. The calculated efficiency (ratio of radiative power to power deposition) is shown in FIG. 6 and saturates near the quantum efficiency of 15%.

It should be emphasized that, although the gain for the system is large (see FIG. 4), significant energy loss due to superradiance will not be a problem due to the low efficiency at small photon flux fields. Significant energy extraction will not only occur in the direction of the incoming oscillator beam, since the intensity of the photon field determines the cross section for radiative collisions.

Further analysis and experimental results are presented in the section on carrying out the invention, and in FIGS. 8-16.

DISCLOSURE

Typical apparatus according to the present invention, for providing stimulated emission of electromagnetic radiation, comprises means for containing a mixture including a first gas, in the X(1) state, and a second gas, in the Y(1) state; means for pumping the first gas to excite a high population density of its atoms or molecules from the X(1) state to the X(2) state; and means for injecting photons of suitable frequency into the mixture, to excite, via a three-body radiative collision of an atom or a molecule of X(2) with a molecule of Y(1) and a photon, a high population density of molecules of the second gas from the Y(1) state to the Y(3) state, followed by a substantially simultaneous return of a substantial portion of the excited first gas atoms or molecules to the X(1) state and a substantial depopulation of the Y(3) state of the second gas, causing the molecules thereof to drop to the lower energy Y(2) state, thereby stimulating the emission from the second gas of two photons at the same wavelength for each absorbed photon, and thus providing a total quantity of photon emission with sufficient gain for amplification of electromagnetic radiation, and finally resulting in the depopulation of the molecules in the Y(2) state by autoionization.

The pumping means typically comprises external means for bringing the first gas from the X(1) state to an excited metastable state X(2). Such means may comprise means for bombarding the gas with electrons, which typically comprises external means for generating an electron beam and directing the beam through a thin foil window to strike the mixture, or it may comprise means for directing neutrons to strike fissionable material to produce energetic fission product particles to strike and thereby ionize a portion of the mixture and thus to produce electrons that bombard X(1) atoms or molecules in the mixture. Other typical external means comprises electrical discharge, radiation, thermal, or chemical means.

Typical photon injecting means comprises an external source of radiation at a frequency substantially resonant with one of the transition frequencies of the second gas. Typically the external source is a laser, such as a tunable dye laser of power sufficient to produce a high density of three-body collisions.

The containing means may comprise a resonant optical cavity for injecting some of the emitted photons back into the mixture to provide self-sustained oscillation.

Typically the first gas comprises metastable atoms or molecules and the second gas comprises molecules with an ionization potential less than the excitation energy of the atoms or molecules of the first gas. The X(1) state typically is the ground state.

The first gas typically is helium, in which the X(1) state is $He(1^1s)$ and the X(2) state is $He(2^3s)$.

The second gas typically is nitrogen, in which the Y(1) state is $N_2(X)$, the Y(2) state is $N_2^*$ (X, $\nu=3$), where * denotes excitation to a Rydberg state near the ionization limit, and the Y(3) state is $N_2^*$ (B, $\nu=4$).

Typically the first gas comprises either a noble gas, such as helium, neon, or argon; or nitrogen. The second gas typically comprises nitrogen, oxygen, carbon monoxide, carbon dioxide, nitric oxide, uranium hexafluoride, or heptafluoroiodopropane.

The gain varies directly with the product of the population density of the atoms or molecules in the X(2) state multiplied by the population density of the molecules in the Y(1) state minus the product of the population density of the atoms or molecules in the X(1) state multiplied by the population density of the molecules in the Y(2) state. Typically the depopulation of the molecule in the Y(2) state to lower nonresonant levels by autoionization is rapid and substantially complete, so that the product of the population density of the atoms or molecules in the X(1) state multiplied by the population density of the molecules in the Y(2) state is negligible, (because [Y(2)] is approximately zero), and thus the gain is substantially proportional to the product of the population density of the atoms or molecules in the X(2) state multiplied by the population density of the molecules in the Y(1) state. The autoionization is substantially complete in a time less than the radiative lifetime.

DRAWINGS

CARRYING OUT THE INVENTION

Figure 1:
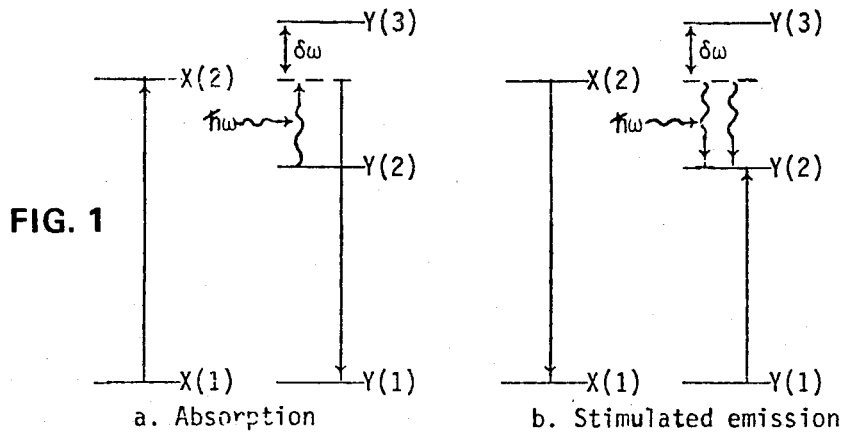
FIG. 1 is an energy level diagram showing radiative collisions for (a) absorptive and (b) stimulated emission processes.
Figure 7:
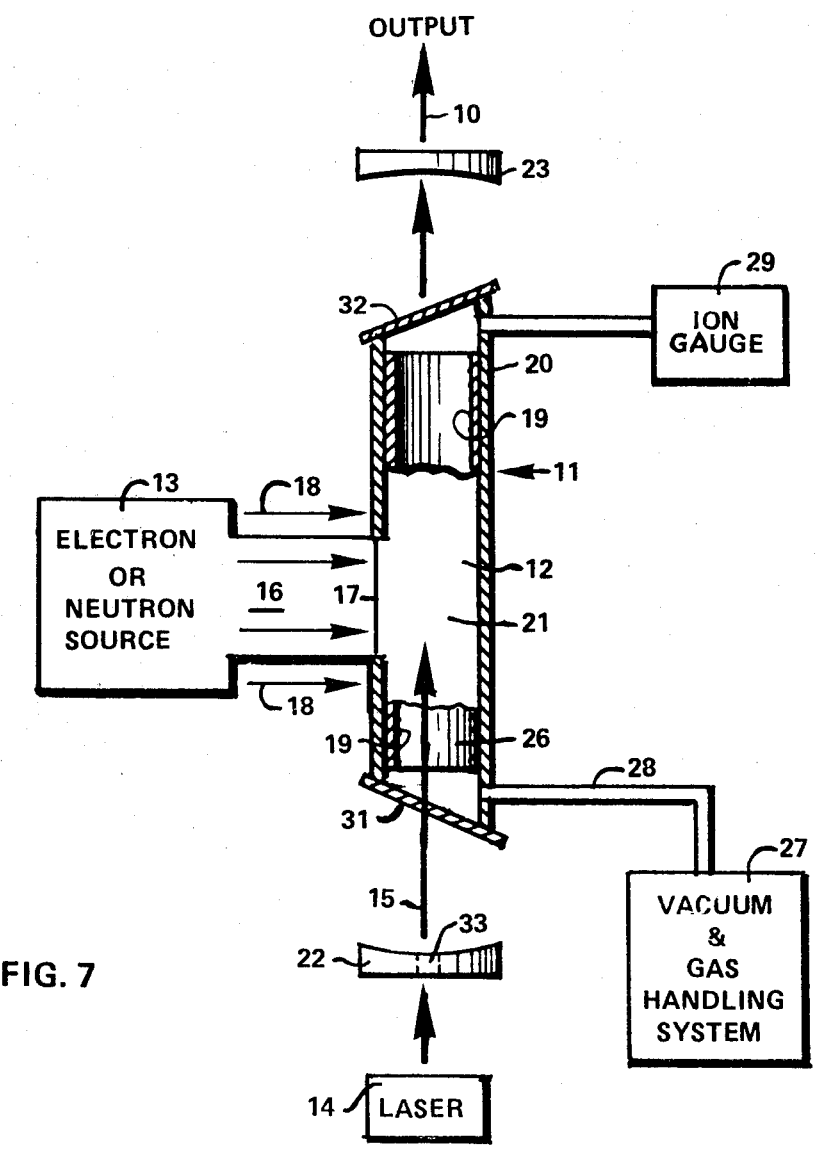
FIG. 7 is a schematic, partly sectional, view of typical apparatus according to the present invention.
Figure 2:
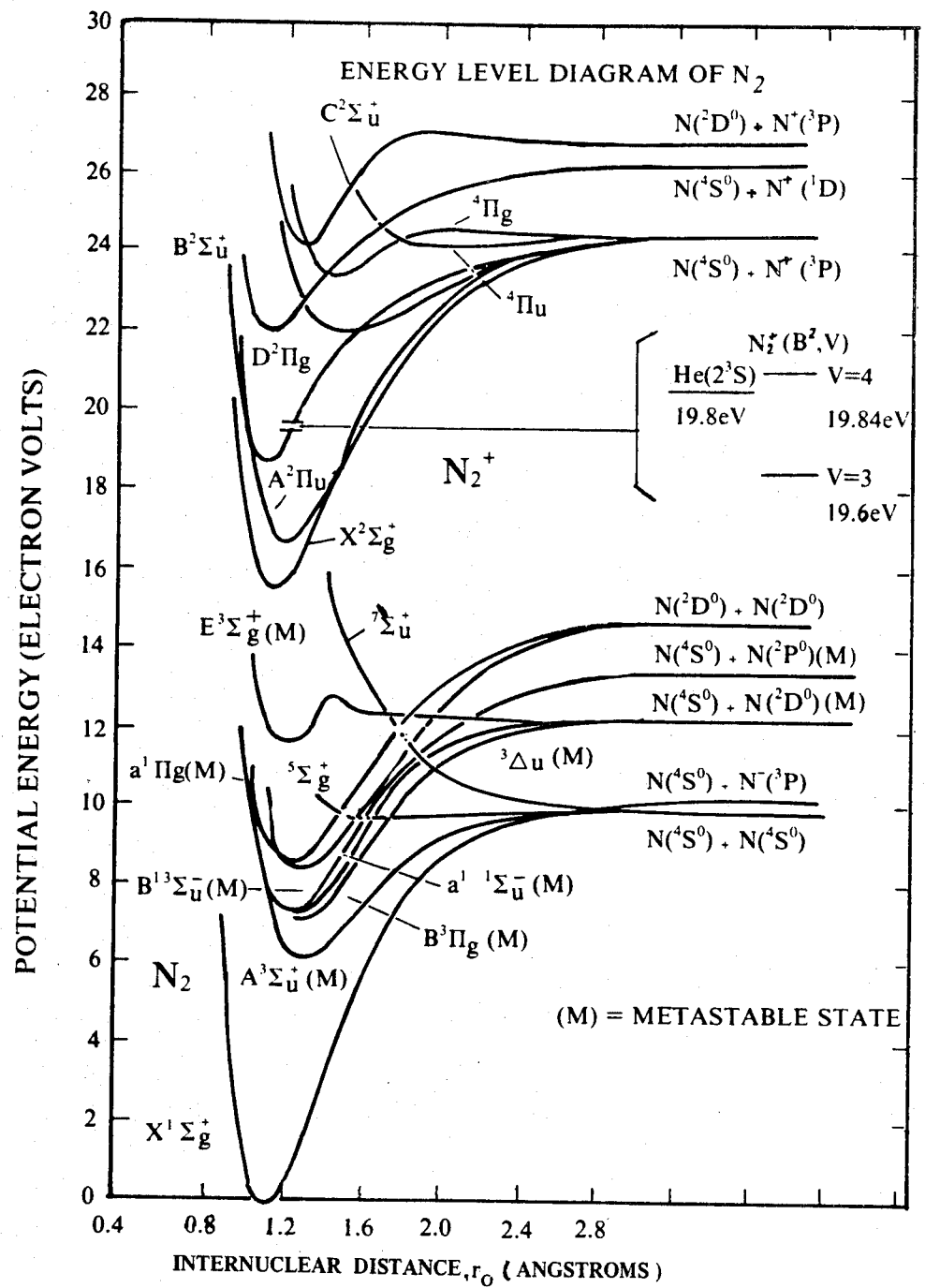
FIG. 2 is a graph of potential energy against internuclear distance for $N_2$. Note the vibrational expansion of the B-state of the ion.

Referring now to FIG. 7, typical apparatus according to the present invention, for providing stimulated emission of electromagnetic radiation 10, comprises means 11 for containing a mixture 12 including a first gas, in the X(1) state, and a second gas, in the Y(1) state; means 13 for pumping the first gas to excite a high population density of its atoms or molecules from the X(1) state to the X(2) state; and means 14 for injecting photons 15 of suitable frequency to the mixture 12, to excite, via a three-body radiative collision of an atom or a molecule of X(2) with a molecule of Y(1) and a photon 15, a high population density of molecules of the second gas from the Y(1) state to the Y(3) state, followed by a substantially simultaneous return of a substantial portion of the excited first gas atoms or molecules to the X(1) state and a substantial depopulation of the Y(3) state of the second gas, causing the molecules thereof to drop to the lower energy Y(2) state, thereby stimulating the emission from the second gas of two photons 10 at the same wavelength for each absorbed photon 15, and thus providing a total quantity of photon emission 10 with sufficient gain for amplification of electromagnetic radiation 10, and finally resulting in the depopulation of the molecules in the Y(2) state by autoionization.

The pumping means typically comprises external means 13 for bringing the first gas from the X(1) state to an excited metastable state X(2). Such means may comprise means 13 for bombarding the gas with electrons, which typically comprises external means 13, such as an electron gun, for generating an electron beam 16 and directing the beam 16 through a thin foil window 17 to strike the mixture 12; or it may comprise means 13, such as a fast burst nuclear reactor, for directing neutrons 18 to strike fissionable material, such as $^3$He added to the gas mixture 12, or solid material 19 placed on the wall 20 of the container 11, to produce energetic fission product particles to strike and thereby ionize a portion of the mixture 12 and thus to produce electrons that bombard X(1) atoms or molecules in the mixture 12. Other typical external means 13 comprises well known electric discharge, radiation, thermal, or chemical means.

Typical photon injecting means comprises an external source 14 of radiation 15 at a frequency substantially resonant with one of the transition frequencies of the second gas. Typically the external source is a laser 14, such as a tunable dye laser 14 of power sufficient to produce a high density of three-body collisions.

In typical embodiments, the first gas is helium and the second gas is nitrogen.

The containing means 11 may comprise a resonant optical cavity 21 with mirrors 22,23 for injecting some of the emitted photons 10 back into the mixture 12 to provide self-sustained oscillation.

A typical embodiment of the invention comprises a direct nuclear pumped laser. As shown in FIG. 7, within the container or laser cell 11 is positioned a cylinder 26 which is coated on the inner wall 19 with the source of ionizing radiation, a fissionable material. The cell 11 is typically made of quartz, while the cylinder 26 typically comprises aluminum, coated either with boron-10, uranium-235, or other fissionable material. The length of the aluminum cyclinders 26 is generally determined by the dimensions of the source of radiation to which the coating 19 is subjected. The cell 11, and in particular the aluminum cylinder 26, is connected to a gas-handling vacuum system 27, such as via a stainless steel vacuum line 28. The gas-handling system 27 is used to introduce the gas 12 into the cylinder 26, to maintain the proper pressure of the gas 12, and to evacuate it when desired. Monitoring of the gas pressure in the cell 11 may be done by an ion gage 29 mounted internally to the laser cell 11. The laser cell 11 is placed adjacent to a source of neutron flux 18 such as a nuclear reactor 13. The laser cell 11 is provided with windows 31,32, cut at either end at Brewster's angle and is placed between the mirrors 22 and 23. The mirror 23 is the output mirror and, as such, has a reflectivity less than that of the other mirror 22. The reflectivities of the mirrors 22,23 should be on the order of 95% or better to prevent losses while the power is building up in the laser active medium. For example, the mirror 22 might have a reflectivity of 99.8% while the mirror 23 might have a reflectivity of 99.5%.

The apparatus may be operated as a quasi steady-state laser or as a pulsed laser. In quasi steady-state with a sufficient neutron flux provided, the lasing action may be made continuous. With pulsed operation, the gas is introduced into the tube 26 by the gas-handling system 27 and, afterward the lasing pulse is outgassed by the gas-handling system 27.

In embodiments of the invention where the particle source 13 comprises an electron gun or other direct source of electrons 16, (or where a gas such as $^3$He is used as the fissionable material), the coating 19 typically is omitted. In embodiments serving as laser amplifiers, the mirrors 22,23 typically are omitted. In embodiments used as oscillators, the external photon source 14 typically is omitted. Where the laser 14 is employed, a hole 33 is provided in the mirror 22 for the photons 15 to pass through.

A typical method according to the invention, for providing stimulated emission of electromagnetic radiation 10 in a mixture including a first gas, in the X(1) state, and a second gas, in the Y(1) state, comprises pumping, via the electron or neutron source 13, the first gas to excite a high population density of its atoms or molecules from the X(1) state to the X(2) state; and injecting, via the laser 14, photons of suitable frequency to the mixture 12, to excite, via a three-body radiative collision of an atom or a molecule of X(2) with a molecule of Y(1) and a photon 15, a high population density of molecules of the second gas from the Y(1) state to the Y(3) state, followed by a substantially simultaneous return of a substantial portion of the excited first gas atoms or molecules to the X(1) state and a substantial depopulation of the Y(3) state of the second gas, causing the molecules thereof to drop to the lower energy Y(2) state, thereby stimulating the emission from the second gas of two photons 10 at the same wavelength for each absorbed photon 15, and thus providing a total quantity of photon emission 10 with sufficient gain for amplification of electromagnetic radiation 10, and finally resulting in the depopulation of the molecules in the Y(2) state by autoionization.

Typically the first gas comprises metastable atoms or molecules and the second gas comprises molecules with an ionization potential less than the excitation energy of the atoms or molecules of the first gas.

Typically the first gas is brought from the X(1) state to an excited metastable state X(2) by external pumping, which typically comprises bombardment by electrons 16. The X(1) state typically is ground state.

The first gas typically is helium, in which the X(1) state is He($1^1$s) and the X(2) state is He($2^3$s).

Typically the photons 15 are injected from an external source 14 of radiation 15 at a frequency substantially resonant with one of the transition frequencies of the second gas. The external photon source typically is a laser 14 such as a tunable dye laser 14 of power sufficient to produce a high density of three-body collisions.

The second gas typically is nitrogen, in which the Y(1) state is N$_2$(X), the Y(2) state is N$_2$* (X, $\nu=3$), where * denotes excitation to a Rydberg state near the ionization limit, and the Y(3) state is N$_2$* (B, $\nu=4$).

Typically the first gas comprises either a noble gas, such as helium, neon, or argon; or nitrogen. The second gas typically comprises nitrogen, oxygen, carbon monoxide, carbon dioxide, nitric oxide, uranium hexafluoride, or heptafluoroiodopropane.

The gain varies directly with the product of the population density of the atoms or molecules in the X(2) state multiplied by the population density of the molecules in the Y(1) state minus the product of the population density of the atoms or molecules in the X(1) state multiplied by the population density of the molecules in the Y(2) state. Typically the depopulation of the molecules in the Y(2) state to lower nonresonant levels by autoionization is rapid and substantially complete, so that the product of the population density of the atoms or molecules in the X(1) state multiplied by the population density of the molecules in the Y(2) state is negligible, (because [Y(2)] is approximately zero), and thus the gain is substantially proportional to the product of the population density of the atoms or molecules in the X(2) state multiplied by the population density of the molecules in the Y(1) state. The autoionization is substantially complete in a time less than the radiative lifetime.

To provide self-sustained oscillation, some of the emitted photons may be injected back into the mixture in a resonant optical cavity.

Figure 8:
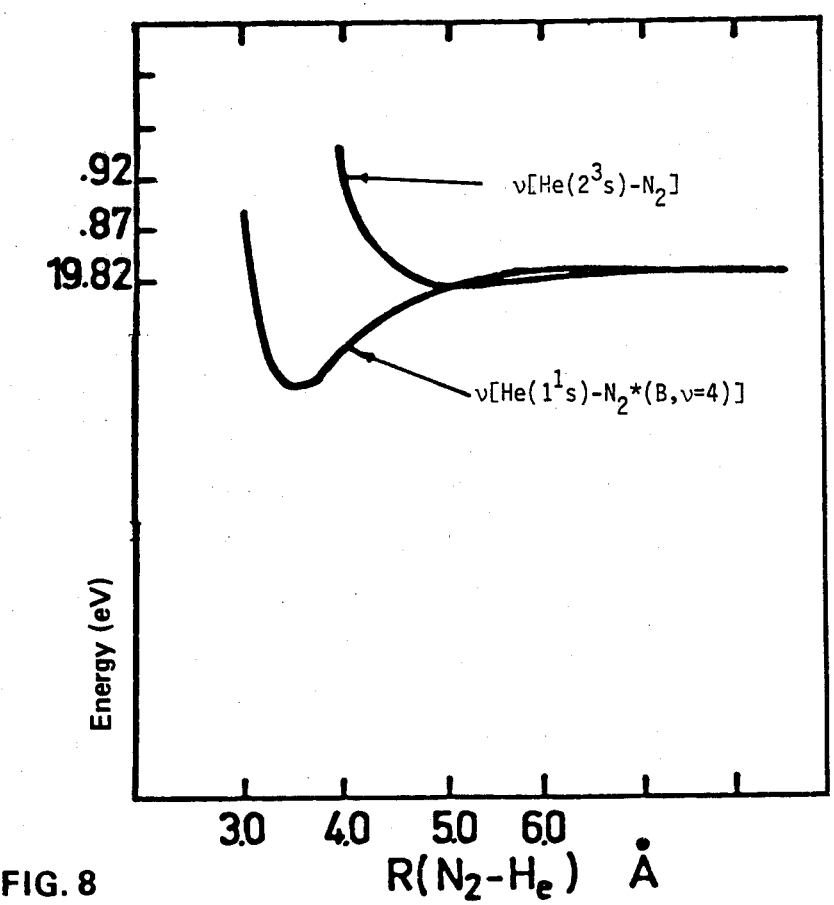
FIG. 8 is a graph of potential energy against interatomic distance for $He(2^3s)-N_2$ and $He(1^1S)-N_2^*(B,\nu=4)$ after Richardson and Setser[20].

As mentioned above, the third method of describing the kind of reaction involved is the quasi-molecule model. Richardson and Setser[20] have presented the potential energy curves for $He(2^3S)-N_2$ and $He(2^1S)-N_2+(B,\nu=0)$. We have made the assumption that the highly excited Rydberg state is similar to the ionic state, and that the increase in the $N_2$ vibronic energy affects only the total energy and not the form of the heteronuclear potential energy curves. With these modifications, the Richardson and Setser potential curves appear in FIG. 8. The double curve crossing shown here may not be real, but the indication that some curve crossing occurs at large internuclear distances (5 to 7Å) is important. In the quasi-molecule model, the incident photon not only stimulates the production of an identical photon but also enhances the state branching at the curve crossing.

Figure 9:
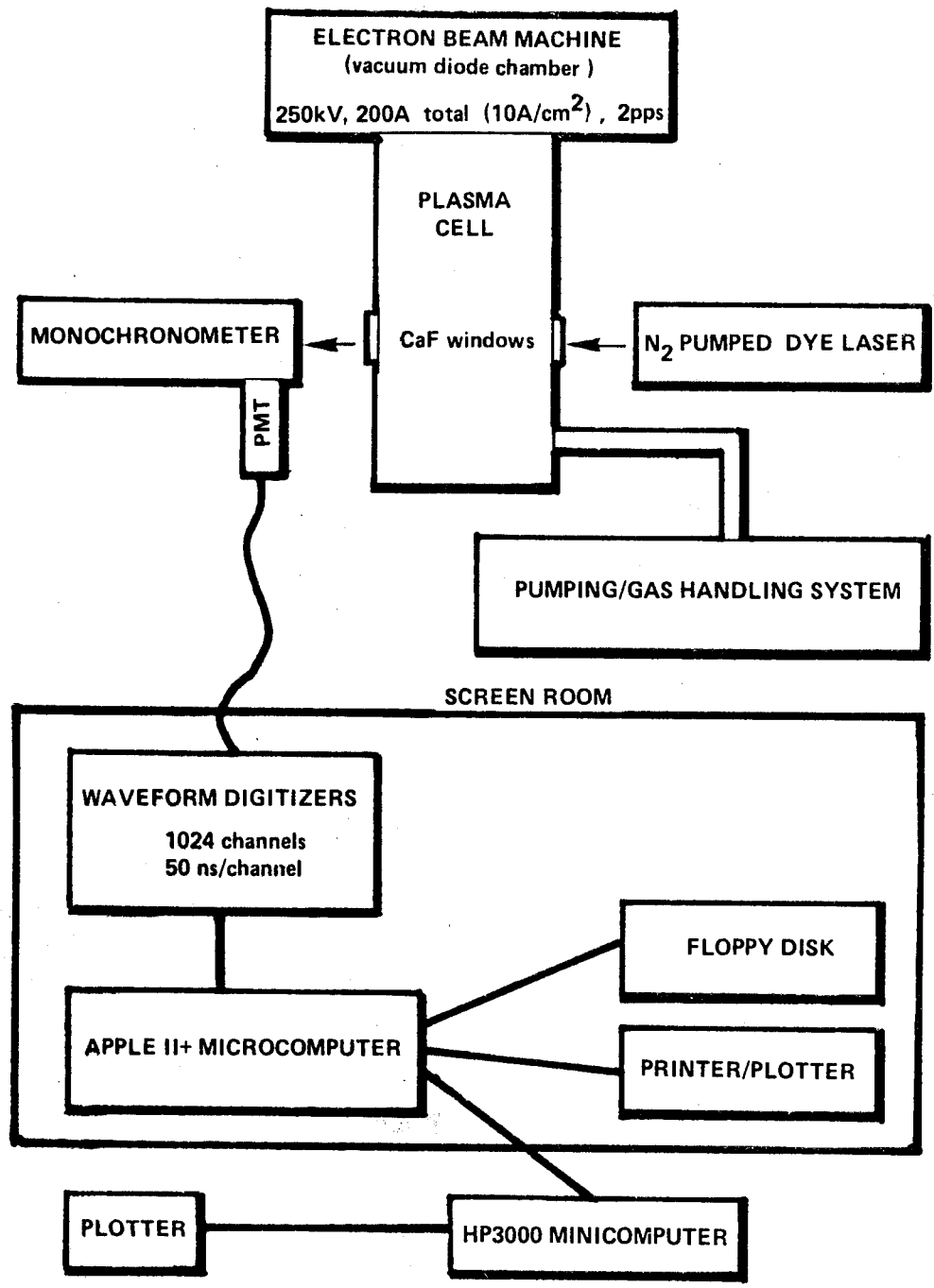
FIG. 9 is a block diagram of an experimental apparatus and a data acquisition and reduction system used in experiments concerning the present invention.

FIG. 9 depicts the experimental apparatus and the data acquisition/reduction systems employed in this study. The electron beam device (Maxwell Laboratories, Excitron Model 20-10R) delivers very reproducible pulses of high energy electrons (250 kV) at a total current of 200 A transmitted through a $2 \times 10$ cm titanium foil (10 A/cm$^2$) at a repetition rate of up to 2 pps. The plasma cell/gas-handling system obtains base pressures of $5 \times 10^{-8}$ Torr prior to high purity gas fill. The plasma cell is equipped with $CaF_2$ windows for introduction of the dye laser probe and observation of the plasma. The geometry of the plasma cell is rather different from that of typical systems of this sort due to demands of other experiments. In addition, we are studying basic plasma processes, not demonstrating new lasers. Nevertheless, with a 99%+ He, He-$N_2$ mixture the energy deposition per unit length is small enough such that the large depth of the cell is not a hinderance at present. A new cell of more conventional geometry is under construction that will allow observation of heavier gases at high pressures (1–5 atm.) with consequent higher energy depositions.

The dye laser probe consists of a home-made nitrogen pump laser coupled to a commercially available (Molectron Corp., Model DL-II) tunable dye laser.

The data acquisition/reduction systems include a ½-meter monochromator (Jarrel-Ash, Model 82-000) with output into a UV-peaked photomultiplier (RCA 7265). Anode signals are routed to an EMI screen room that houses the electronics for a CAMAC computer-controlled data acquisition/reduction system. Two wave-form digitizers (LeCroy, Model 2256 A) allow observation of the transient PMT signal sampling with integration periods as fast as 50 ns. Future multiplexing of the digitizers will increase time resolution to 25 ns/sampling period. In addition, a variable pre-triggering capability allows accurate baseline records. An on-line microcomputer (Apple II PLUS) controls all digitizer functions as well as data accumulation, handling and storage (floppy disk). An off-line minicomputer (HP 3000) and digital plotter are currently utilized to display processed data. Oscilloscope display of electron-beam voltage and current waveforms allows rejection of data due to e-beam malfunction (e.g. pre-fire, pre-divert, excessive cathode flaring, synchronization problems, etc.). Due to the exceptional reproducibility of e-beam characteristics, to date, only prefire has caused data rejection.

Figure 10:
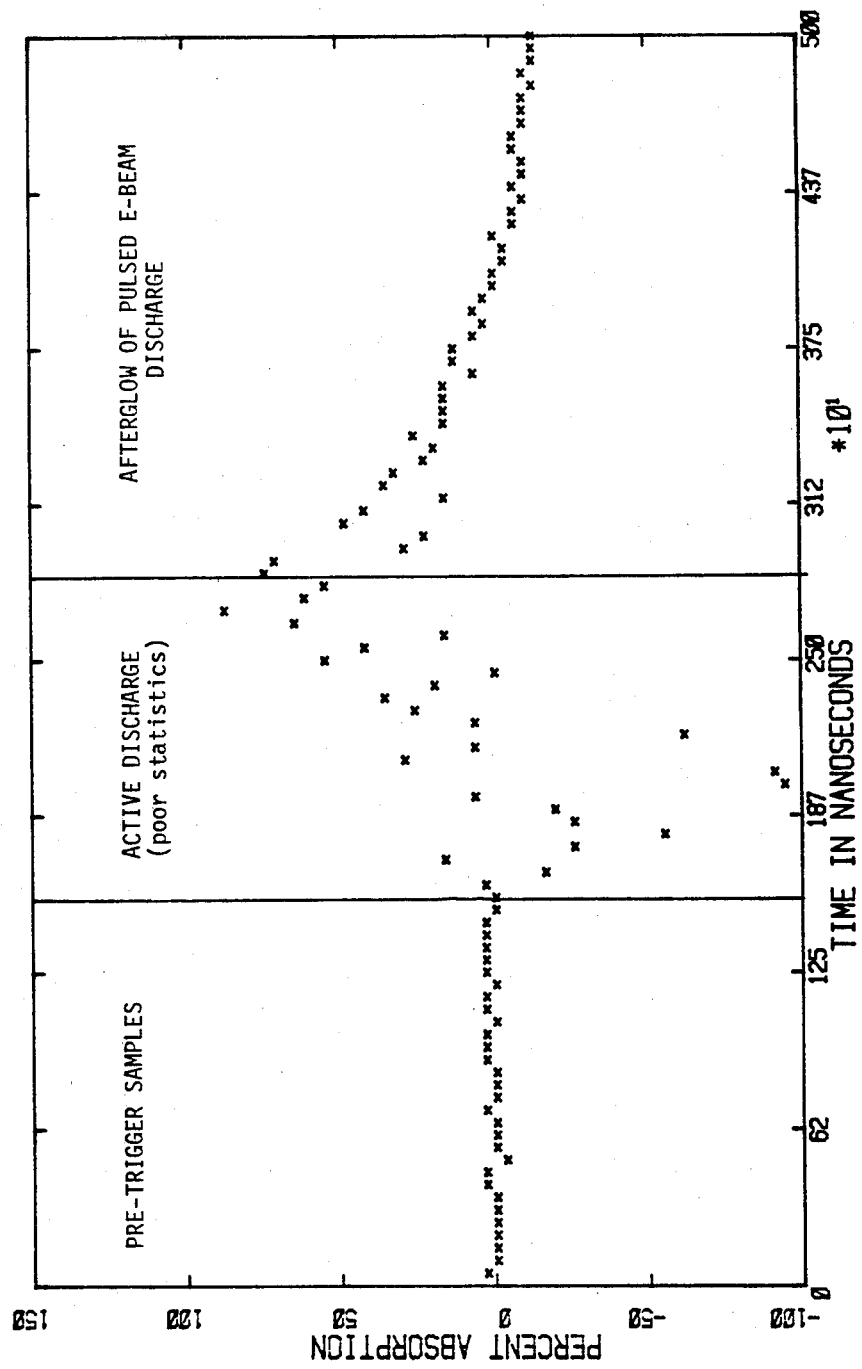
FIG. 10 is a graph of percent absorption at 3889 Angstroms against time for experimental He-$N_2$ plasmas.

Large $He(2^3S)$ metastable densities are necessary for efficient operation of the laser amplifier based on radiative collisions described above. Preliminary results for a pure He plasma at 700 Torr indicate, based on 3889Å radiation absorption ($He(2^3S \rightarrow 3^3P)$), that the peak absorption is 65%(see FIG. 10). Estimates of the metastable density based on this measurement indicate peak densities (i.e. at the beginning of the afterglow) of between $10^{13}$ and $10^{14}/cm^3$ which agrees well with previous theoretical predictions.<Absorption measurements for the He—$N_2$ plasma indicate that introduction of between 0.01% and 1% $N_2$ lowers the metastable density by roughly one and two orders of magnitude, respectively, in both the active discharge and the afterglow.

Figure 11:
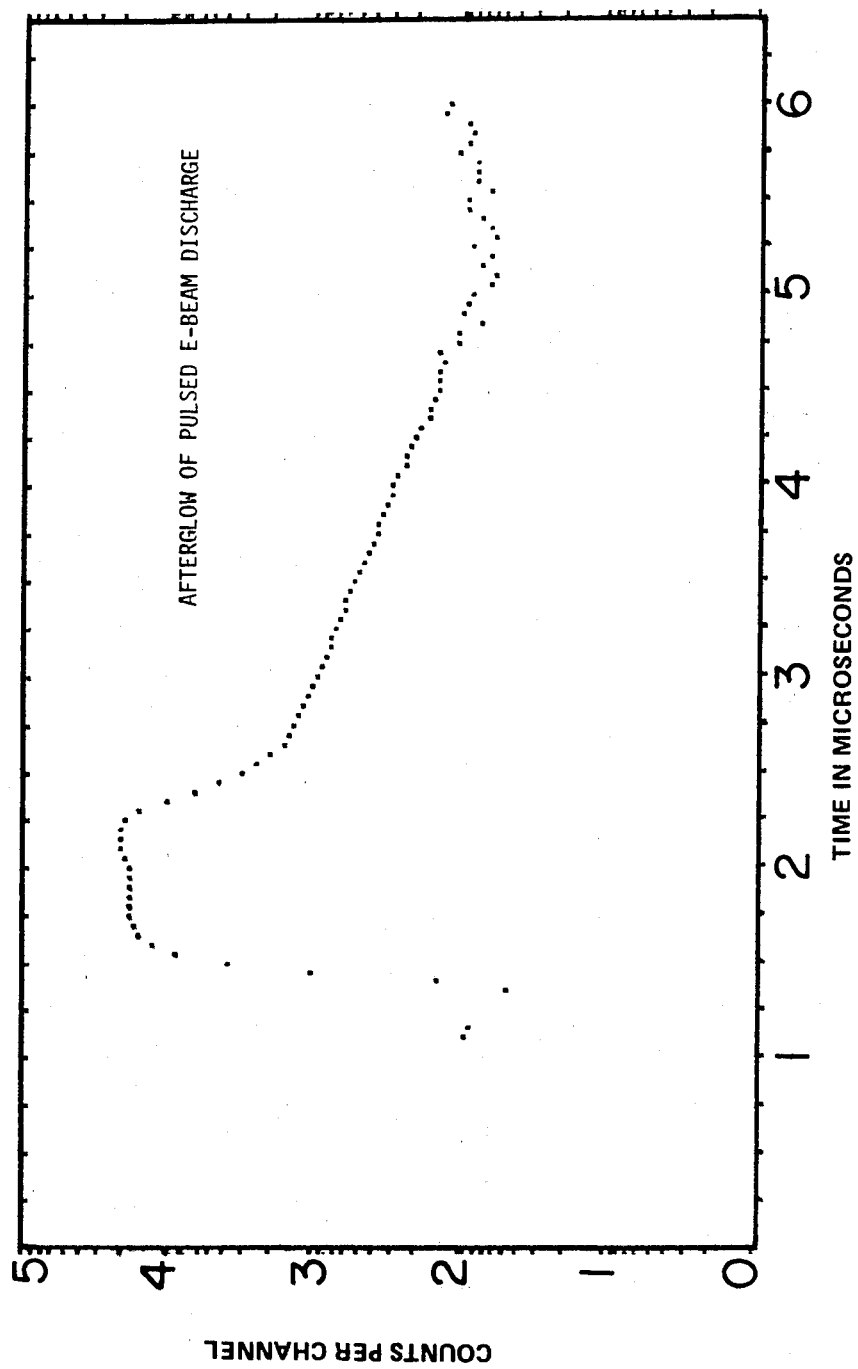
FIG. 11 is a graph of emission at 3914 Angstroms against time showing stationary afterglow of pulsed E-beam discharge.

Upon the addition of $N_2$ the optical emission due to the *normal* Penning transfer to $N_2$ becomes an indicator of $He(2^3S)$ density and, in the afterglow, a measure of the $He(2^3S)$ destruction rate.[22] FIG. 11 shows a typical emission profile we measure for the $N_2^+(B \rightarrow X)$ at 3914Å. This permits experimental verification of the predicted stimulated emission due to radiative collisions presented above. If, in the afterglow, a high power density (10 kW/cm$^2$ or higher) dye laser pulse at 3538Å is directed through the plasma then, within the volume of the plasma interacting with the laser pulse, radiative collisions should give stimulated emission at that wavelength. Simultaneous observation of 3914Å radiation should show a decrease in intensity due to the increase in the destruction rate of $He(2^3S)$ metastables that feed both the 3914Å A spontaneous emission and the 3538Å stimulated emission from the radiative collision. It should also be noted that absence of $He(2^1S)$ metastables and helium ions during the afterglow[10] precludes the possibility that the energy transfer to $N_2$ and subsequent optical emission are due to any species other than $He(2^3S)$ metastables. Spontaneous emission from reaction (7) has also been measured using the system described above (see FIG. 12) as well as in a flowing afterglow experiment.

Figure 13:
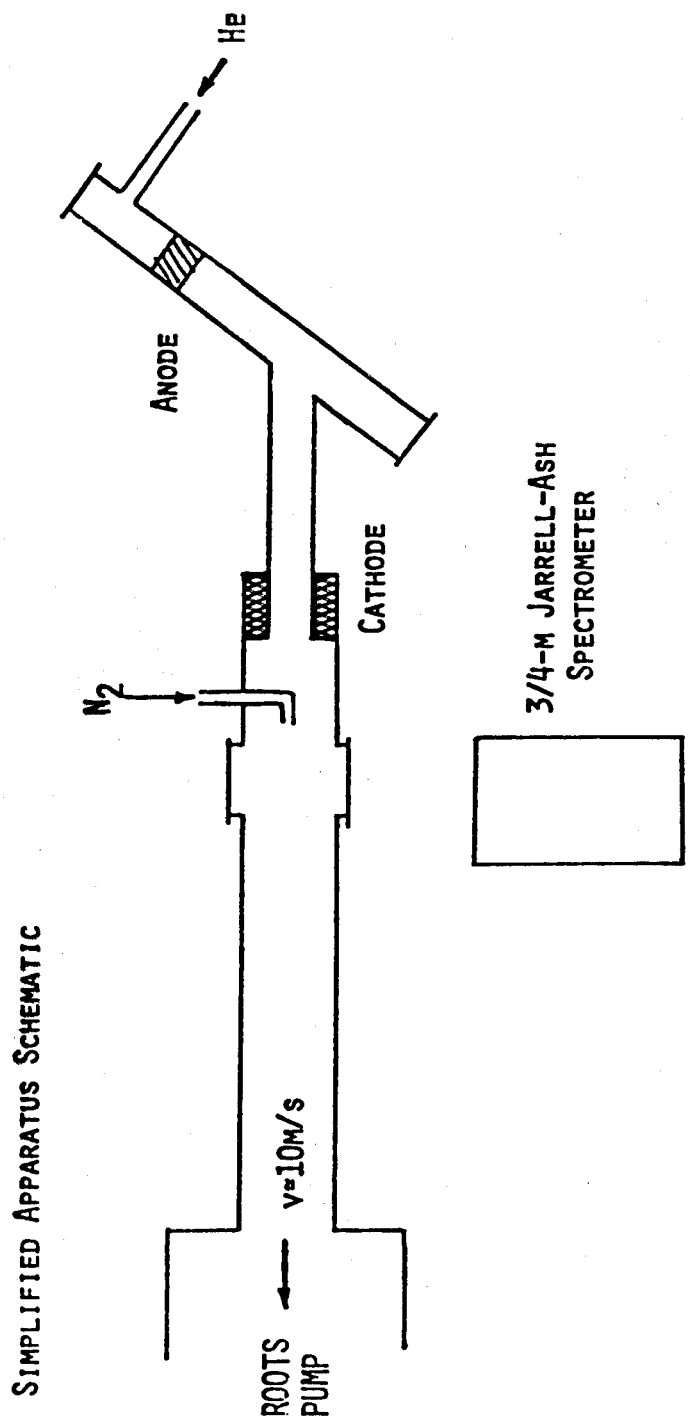
FIG. 13 is a simplified schematic view of flowing afterglow apparatus used in the experiments.

Emission of light at 3532Å and 3538 Å has been detected in flowing afterglow experiments. FIG. 13 depicts the flowing afterglow apparatus in which a high speed Roots vacuum pump is used to maintain a high speed, low pressure ($\sim 10$ m/s, 1 Torr) gas glow. In this experiment, helium is flowed through an electrical discharge and into a sample tube. Along the flow, distance from the discharge is directly proportional to the time into the afterglow. Nitrogen is introduced into the helium flow five centimeters (about five milliseconds) after the discharge. The nitrogen reacts with the long-lived helium excited states which survive the five millisecond flow. The reaction is monitored by optical spectroscopy on the light emitted by the short-lived nitrogen excited states produced in the reaction.

The helium is excited in a low current ($\sim 10$ mA) discharge. In afterglow discharges of this type, $He(2^3S)$ is the dominant excited species. The other long-lived excited states are He+ and He($2^1$S). Helium ions (and electrons) which are produced in small concentrations in the discharge are lost in the afterglow through ambipolar diffusion to the walls. The He($2^1$S) is produced in large quantities in the discharge but is lost quickly in the afterglow due to superelastic collisions with free electrons. In experiments of this kind, He($2^1$S) concentration is typically one or two percent of the He($2^3$S) concentration and the He$^{30}$ concentration is negligible. Hence the only significant reaction is He($2^3$S)+N$_2$→products.

Figure 14:
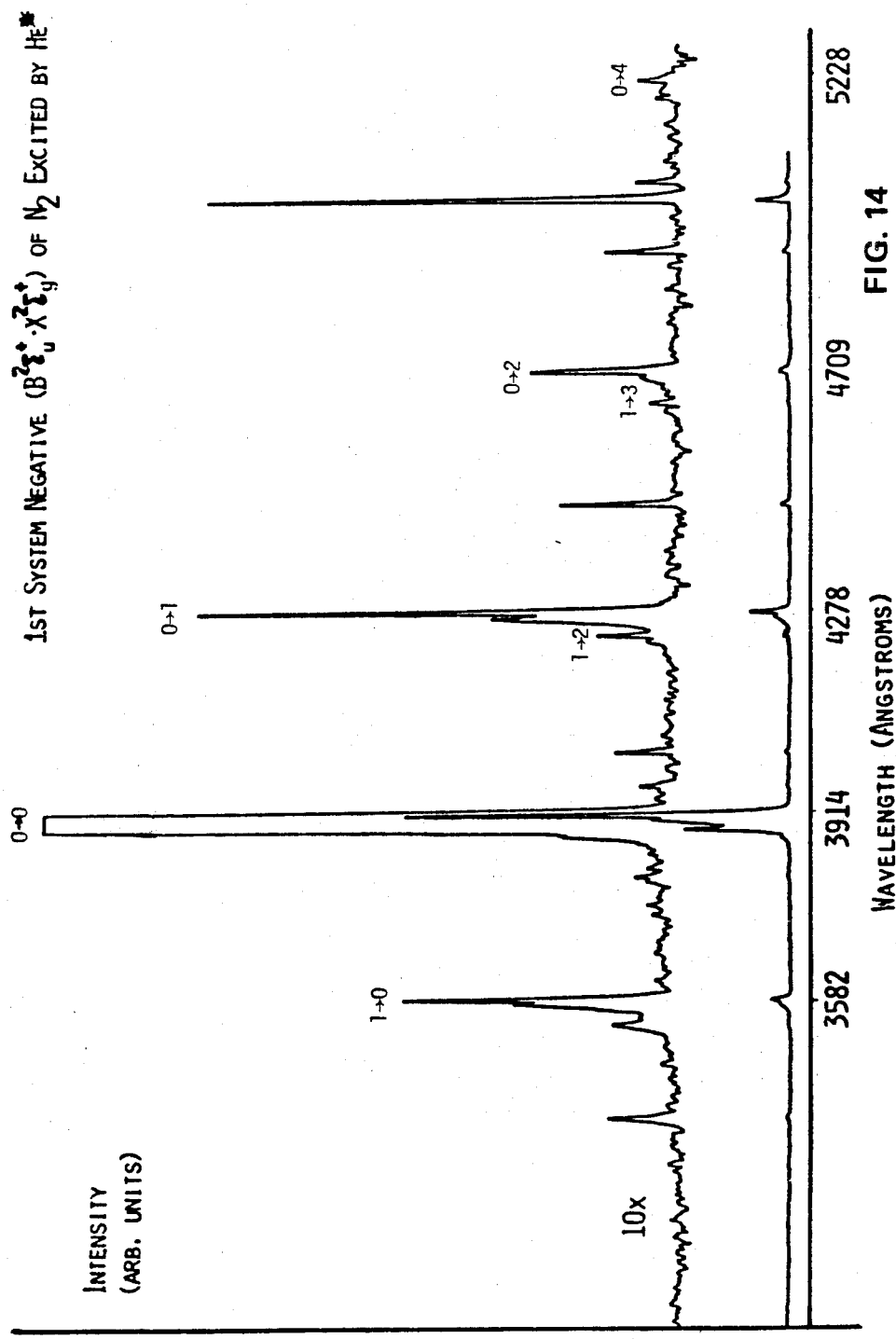
FIG. 14 is a spectrogram of the nitrogen product emission from about 3000 to 5240 Angstroms for first system negative of nitrogen excited by the triplet helium metastable.
Figure 15:
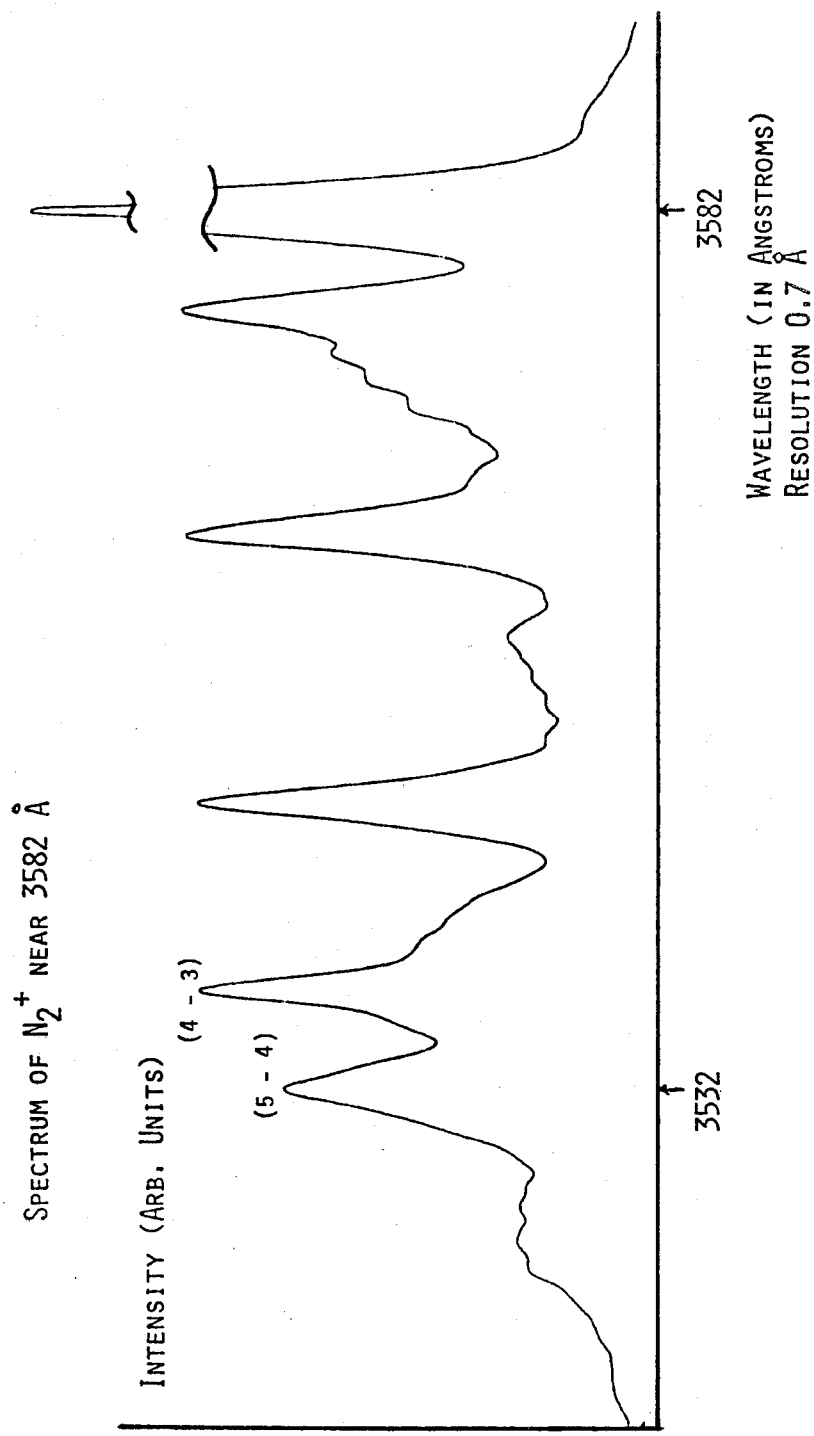
FIG. 15 is a spectrogram of positive ion nitrogen emission from about 3500 to 3600 Angstroms.

FIG. 14 shows two spectra of the nitrogen product emission. The second spectrum is taken at ten times the sensitivity. From the spectrum one can determine that the nitrogen emission at 3582Å is 5% of the emission level at 3914Å. This is a lower limit since both the spectrometer and photomultiplier sensitivities peak at larger wavelengths. FIG. 15 depicts the emission spectrum between 3500Å and 3600 Å. Emission at 3532Å and 3538Å corresponds to the N$_2^{*(B,5)}$→N$_2^*$(X,4) and N$_2^*$(B,4)→N$_2^*$(X,3) transitions, respectively. Depending on how one interprets background, these both have one quarter to one half the intensity of 3582Å, or around 2% of the intensity of 3914Å.

Figure 16:
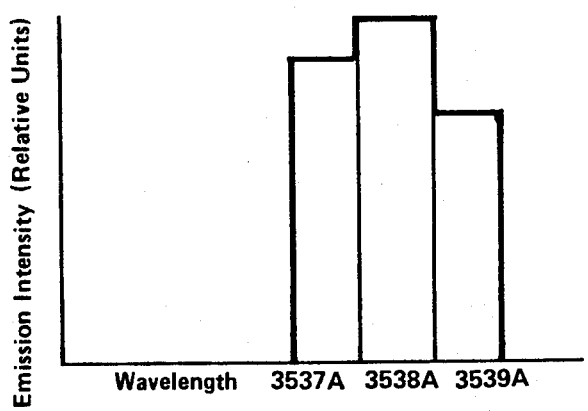
FIG. 16 is a bar graph of nitrogen emission at 3537, 3538, and 3539 Angstroms one microsecond into the afterglow. Time resolution is 200 nanoseconds, and the statistical error is about 4 percent.
Figure 12:
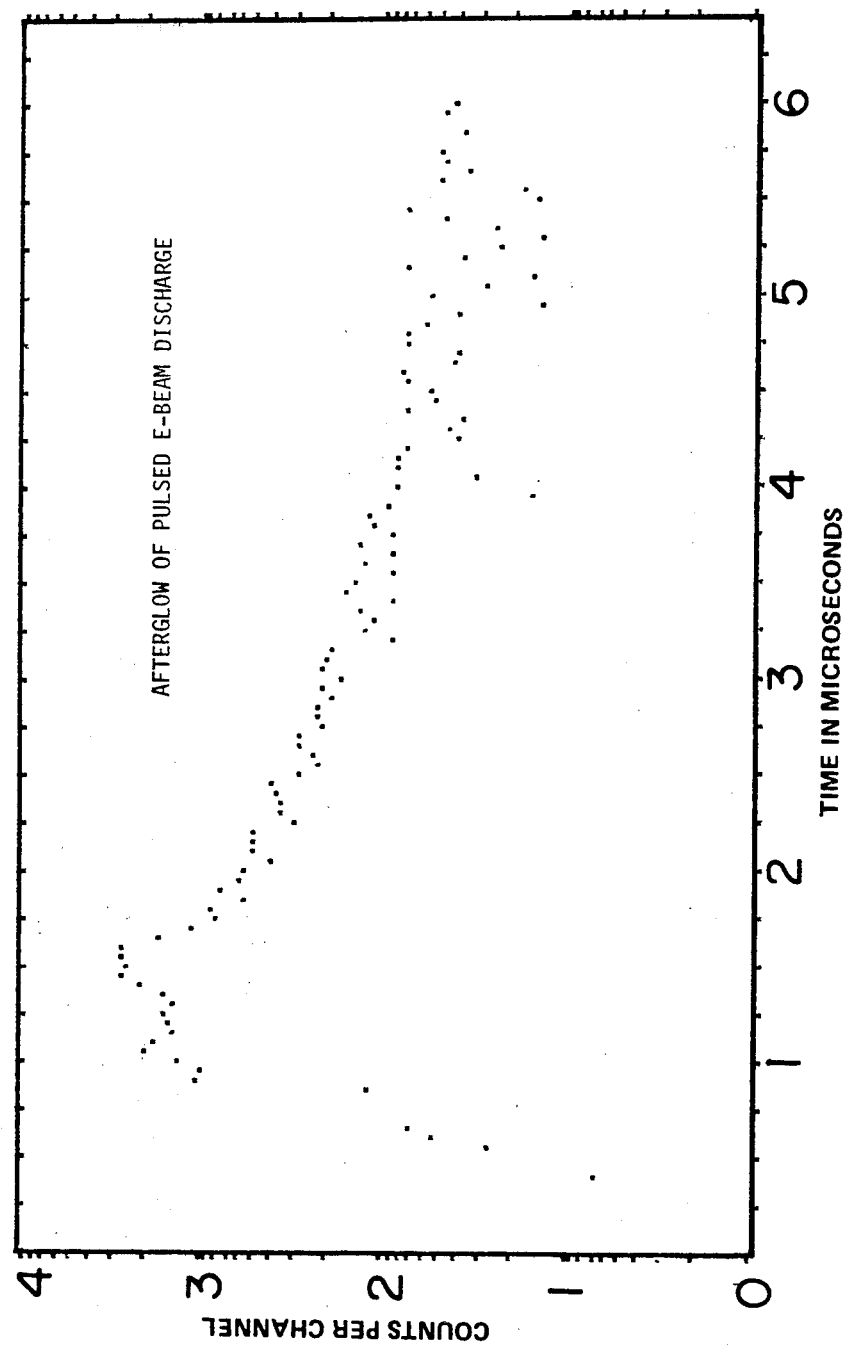
FIG. 12 is a graph of emission at 3538 Angstroms against time showing stationary afterglow of pulsed E-beam discharge.

A verification of the ratio of the intensity of 3538Å radiation to that of 3914Å radiation from the flowing afterglow experiment can be obtained from the electron-beam results shown in FIGS. 11 and 12. Since the 3914Å radiation plotted in FIG. 11 and the 3538Å emission plotted in FIG. 12 were taken under identical experimental conditions, the ratio of the intensities $I_{3538}/I_{3914}$ can be found directly from the raw data. The ratio calculated in that way (1.9%) agrees very well with that found in the flowing afterglow experiment (2%). FIG. 16 shows that the radiation at 3538 Å seen in the electron beam results has a profile compatible with that of the flowing afterglow spectrum, FIG. 15.

Following the analysis above, the ratio $I_{3538}/I_{3914}$ gives us an experimental verification of the calculated radiative collision cross-section. This can be seen as follows. The production of 3914Å radiation can be expressed as $$kI_{3914} = |I_{3914}| = <\sigma_p v>[M][N_2], \quad (12)$$

where $\sigma_p$ is the cross-section for the indicated Penning reaction scaled according to the branching ratio and all other symbols are as above,

[M] represents the He($2^3$S) metastable density and k is a detection system response coefficient. Similarly, for the 3538Å radiation intensity, $$kI_{3538} = |I_{3538}| = A[M][N_2], \quad (13)$$

where A is the Einstein A coefficient. It should be noted here that, as above, we are defining effective Einstein coefficients, i.e., $$A_{\text{Einstein}}^{\text{Effective}} = A[M], \text{ and} \quad (14)$$

$$B_{\text{Einstein}}^{\text{Effective}} = B[M]. \quad (15)$$

Taking the ratio of 13 to 12 gives $$\frac{I_{3538}}{I_{3914}} = \frac{A}{\sigma_p v} \quad (16)$$

Recall that for radiative collisions (equations 4 and 6), $$<\sigma_{RC} v> = B\rho(v), \quad (17)$$

where $\sigma_{RC}$ is the radiative collision cross section. The ratio[23] of the Einstein coefficients is $$\frac{A_{\text{Einstein}}^{\text{Effective}}}{B_{\text{Einstein}}^{\text{Effective}}} = \frac{A}{B} = \frac{8\pi h v^3}{c^3} \quad (18)$$

From 16, 17 and 18, it is seen that $$A = \frac{I_{3538}}{I_{3914}} \sigma_p v = \frac{8\pi h v^3}{c^3} \cdot \frac{\sigma_{RC} v}{\rho(v)} \quad (19)$$

where $\rho(v)$ is the energy density per unit frequency. If $\rho(v)$ is peaked at a particular frequency $v_o$, then $$\rho(v_o) = \rho_v g(v_o) = I_{v_o}/C \, \delta v_o \quad (20)$$

where $I_{v_o}$ is the radiation intensity in W/m$^2$, $g(v_o)$ is the linewidth distribution and $\delta v_o$ is the linewidth[11]. From 19 and 20

$$\sigma_{RC} = \frac{I_{3538}}{I_{3914}} \frac{c^2}{8\pi h v^3} \sigma_p \frac{I_{v_o}}{\delta v_o} \quad (21)$$

or $$\sigma_{RC} = \frac{I_{3538}}{I_{3914}} \frac{\lambda^3}{4hc} \sigma_p \frac{I_{\omega_o}}{\delta \omega_o} \quad (22)$$

Figure 3:
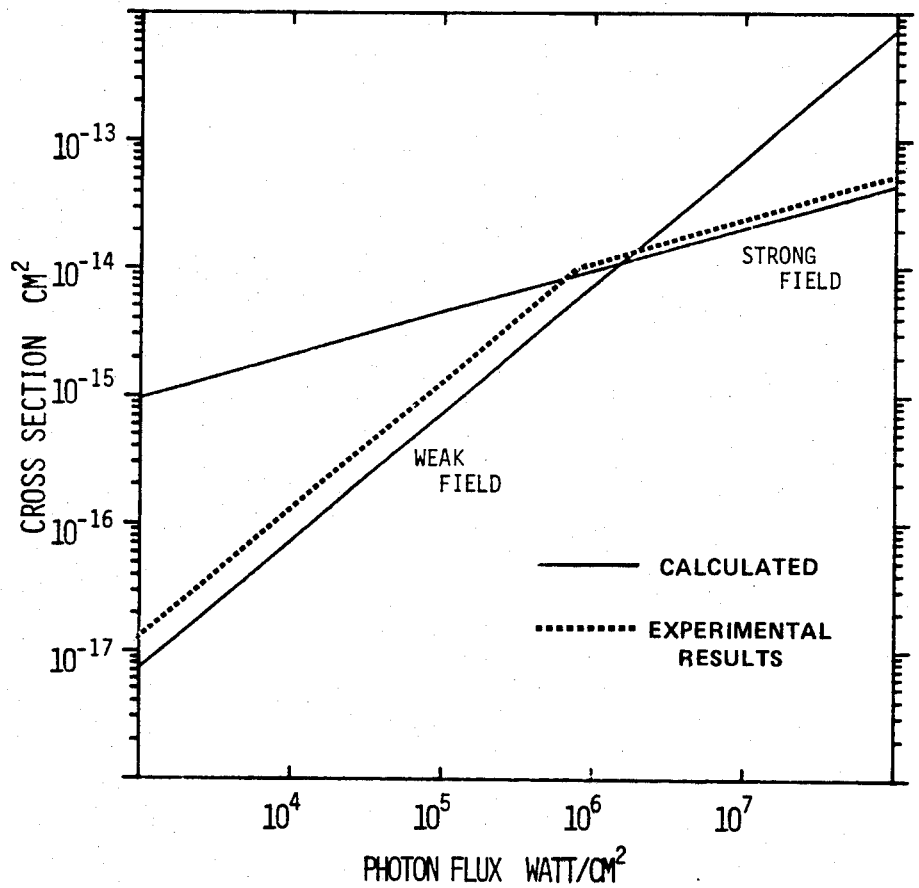
FIG. 3 is a graphical representation of cross section of a dipole-quadrupole radiative collision against photon flux as calculated by Eq. 12 (weak field) and Eq. 13 (strong field)[3] for the helium-nitrogen system. Experimental results are also plotted in FIG. 3.
Figure 4:
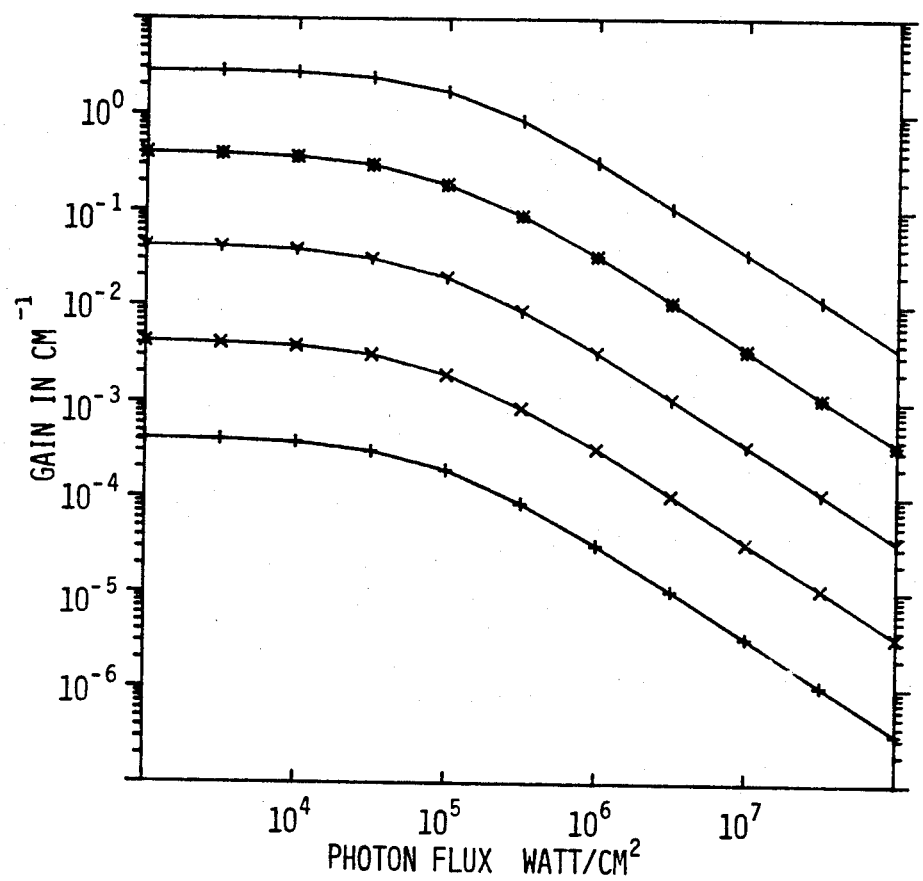
FIG. 4 is a graph of predicted gain against photon flux for 1% $N_2$ in 700 Torr of helium for power depositions of 200 W/cm$^3$ to 2 MW/cm$^3$ under the influence of 10 KW/cm$^2$ to 100 MW/cm$^2$ photons.
Figure 5:
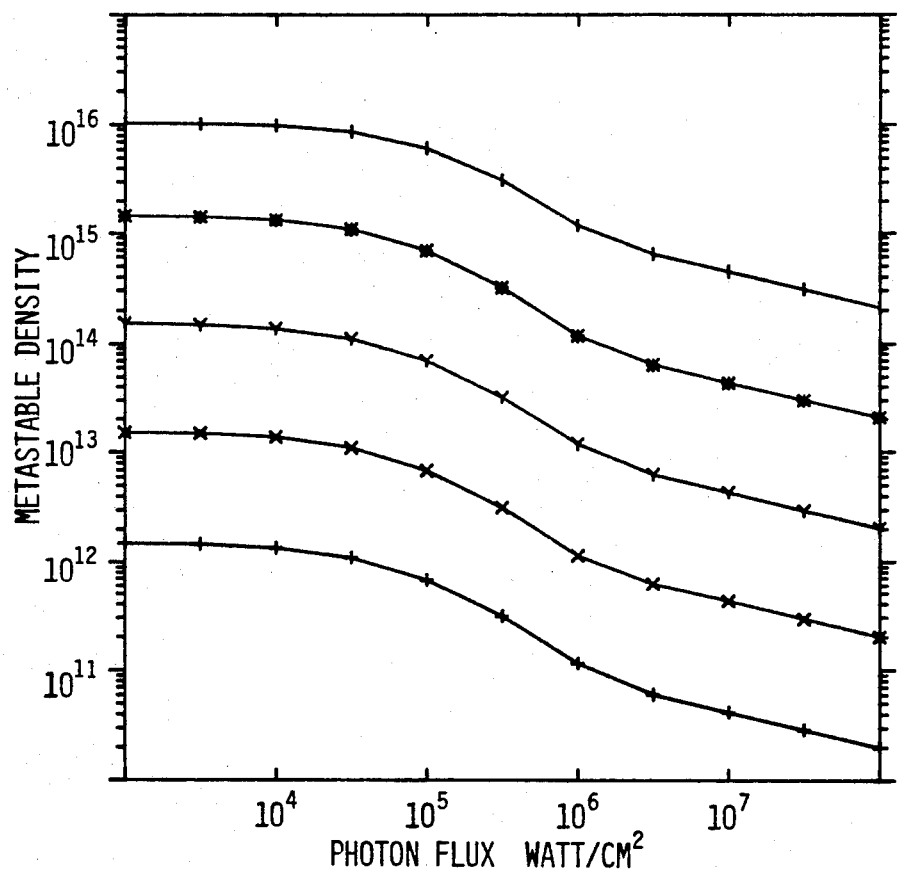
FIG. 5 is a graph of predicted metastable ($He(2^3S)$) densities against photon flux for 1% $N_2$ in 700 Torr of helium for power depositions of 200 W/cm$^3$ to 2 MW/cm$^3$ under the influence of 10 KW/cm$^2$ to 100 MW/cm$^2$ photons.
Figure 6:
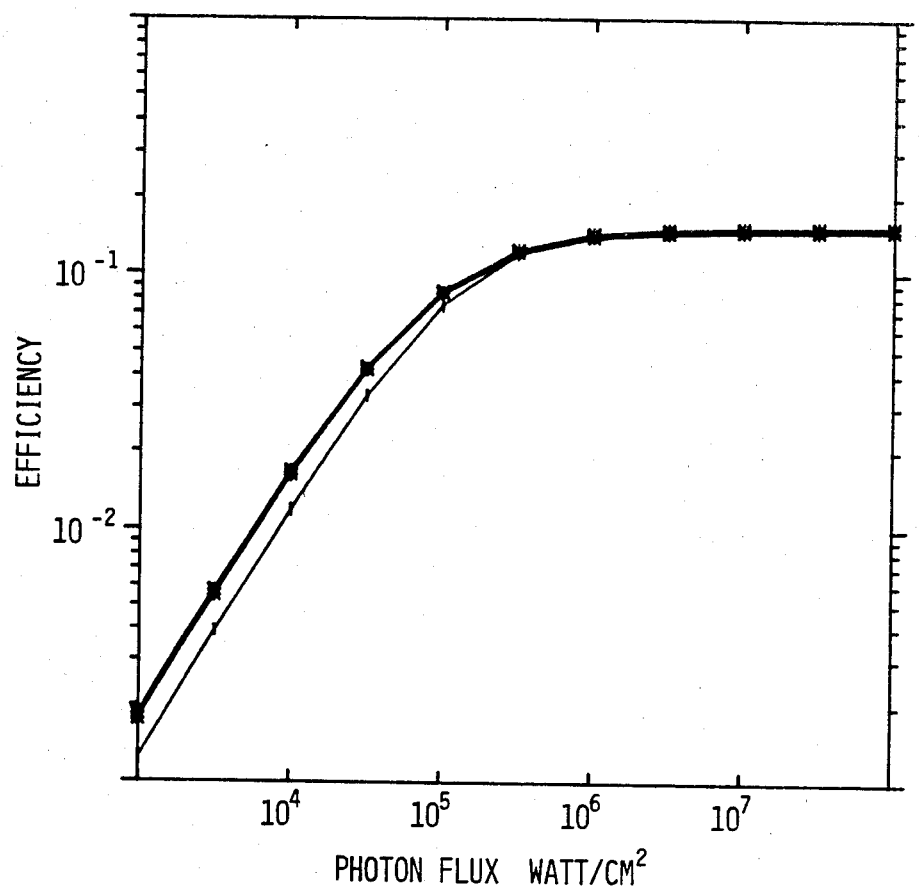
FIG. 6 is a graph of predicted efficiency against photon flux for 1% $N_2$ in 700 Torr of helium for power depositions of 200 W/cm$^3$ to 2 MW/cm$^3$ under the influence of 10 KW/cm$^2$ to 100 MW/cm$^2$ photons.

Using the measured ratio of $I_{3538}/I_{3914}$, a linewidth of 2 cm$^{-1}$ ($\delta \omega_o = 3.8 \times 10^{11}$ sec$^{-1}$) and $I_{107_o} = 10^3$ W/cm$^2$ gives $$\sigma = 1.4 \times 10^{-17} \text{ cm}^2 \quad (23)$$

or $$\sigma = 1.4 \times 10^{-20} \text{ cm}^4/\text{W } (I_{107_o}) \quad (24)$$

where, now, $I_{107_o}$ is in W/cm$^2$. This is shown on FIG. 3 an the strong field results are inferred from theory. It is evident that the theory agrees well with this indirect measurement of the cross-section.

Experimental work has developed as its focus a new type of laser amplifier based on radiative collisions. The particular medium in which the radiative collisions can be identified is the afterglow of a high-pressure helium-nitrogen plasma. Ongoing work includes measurement of relative spontaneous emission intensities from radiative collisions between He($2^3$S) metastables and ground state nitrogen molecules. Table 2 shows a list of transitions in nitrogen that should be observable in helium-nitrogen afterglow due to radiative collisions. Several of these transitions have already been observed in both high-pressure electron-beam discharge and low pressure flowing afterglow apparatus. Current experimental work consists of measuring the optical radiation at the wavelengths of table 2 as functions of partial pressures of N$_2$ and total system pressure. Also, emission at 3914A (radiation from the normal Penning ionization) and absorption at 3889A (for helium metastable density measurements) is measured to give indirect checks on cross-section calculations and verification of kinetics model codes, respectively. The experiments should provide useful information for developing further embodiments and applications of the invention.

The technical program will first demonstrate the modulation of the helium metastable density in the afterglow of an electron-beam discharge by the dye laser probe through radiative collisions. These items include a TEA discharge laser that will pump an existing dye laser at the wavelengths of interest. The TEA laser can also be mode-locked by the existing nitrogen pumped dye laser to provide high photon fluxes in the region of 3532A. Also, since several of the most interesting transitions are elsewhere in the near ultraviolet, commercially available add-ons to the existing dye laser must be procured and installed. These include a flowing dye cell for the amplifier section of the dye laser and a doubling crystal and mount. Following this initial procurement/checkout period the discharge pumped dye laser will be coupled to the electron-beam initiated plasma afterglow and emission at 3914A and absorption at 3889A will be observed during the dye laser (or TEA laser) pulses at wavelengths identified as the most promising candidates by the earlier program. Observation of any modulation of the metastable density by the probe laser will demonstrate that the basic process of stimulated emission from radiative collisions is possible, independent of any absorptions that might otherwise confuse the results of direct gain measurements.

TABLE 2

| $\lambda(\text{Å})$ | B − X $v' - v''$ | F-C Factor | F-C Product[a] | Ratio to 3538Å[b] | RANK |
|---|---|---|---|---|---|
| 5485.5 | 4 − 8 | $5.2 \times 10^{-2}$ | $2.6 \times 10^{-10}$ | $1.5 \times 10^{-6}$ | 13 |
| 5420.8 | 5 − 9 | $6.2 \times 10^{-2}$ | $4.5 \times 10^{-11}$ | $2.6 \times 10^{-7}$ | 15 |
| 5372.3 | 6 − 10 | $6.7 \times 10^{-2}$ | $7.4 \times 10^{-12}$ | $4.2 \times 10^{-8}$ | 16 |
| 4957.9 | 4 − 7 | $1.1 \times 10^{-1}$ | $4.18 \times 10^{-9}$ | $2.4 \times 10^{-5}$ | 10 |
| 4913.2 | 5 − 8 | $1.1 \times 10^{-1}$ | $5.5 \times 10^{-10}$ | $3.1 \times 10^{-6}$ | 12 |
| 4881.7 | 6 − 9 | $1.1 \times 10^{-1}$ | $8.0 \times 10^{-11}$ | $4.6 \times 10^{-7}$ | 14 |
| 4515.9 | 4 − 9 | $1.5 \times 10^{-1}$ | $4.8 \times 10^{-8}$ | $2.7 \times 10^{-4}$ | 7 |
| 4490.3 | 5 − 7 | $1.3 \times 10^{-1}$ | $4.9 \times 10^{-4}$ | $2.8 \times 10^{-5}$ | 9 |
| 4466.6 | 6 − 8; 8 − 10 | $1.1 \times 10^{-1}$ $7.7 \times 10^{-2}$ | $5.5 \times 10^{-10}$ | $3.1 \times 10^{-6}$ | 12 |
| 4140.5 | 4 − 5 | $4 \times 10^{-2}$ | $1.24 \times 10^{-7}$ | $7.1 \times 10^{-4}$ | 5 |
| 4121.3 | 5 − 6 | $4.4 \times 10^{-2}$ | $1.4 \times 10^{-8}$ | $8 \times 10^{-5}$ | 8 |
| 4110.9 | 6 − 7 | $2 \times 10^{-2}$ | $7.6 \times 10^{-10}$ | $4.3 \times 10^{-6}$ | 11 |
| 3818.1 | 4 − 4 | $4.75 \times 10^{-3}$ | $1.7 \times 10^{-7}$ | $9.7 \times 10^{-4}$ | 4 |
| 3806.8 | 5 − 5 | $1.63 \times 10^{-2}$ | $5.1 \times 10^{-8}$ | $2.9 \times 10^{-4}$ | 6 |
| 3538.3 | 4 − 3 | $3.88 \times 10^{-1}$ | $1.75 \times 10^{-4}$ | 1.00 | 1 |
| 3532.6 | 5 − 4 | $3.64 \times 10^{-1}$ | $1.27 \times 10^{-5}$ | $7.3 \times 10^{-2}$ | 3 |
| 3291.6 | 5 − 3 | $2.2 \times 10^{-1}$ | $9.9 \times 10^{-5}$ | $5.6 \times 10^{-1}$ | 2 |

[a] F-C product is the product of the Frank Condon factor for each listed transition and the Frank Condon factor for the transition from the $N_2$ (X, v = 0) to $N_2^+$ (X, v). This product gives a way to rank the various transitions according to the ease of producing stimulated emission from the radiative collision that produces that transition.
[b] This column represents the ratio for each listed transition of the Frank Condon factor product to that of 3538.3Å. This quantity represents a rough scale factor for the cross-section for each transition relative to the calculated cross-section of FIG. 7.

Simultaneous experiments using the flowing afterglow system at present are focused on observation of spontaneous emission at the wavelengths listed in Table 2. Much of the flowing afterglow work will involve gaining experience with the basic character of the spontaneous emission spectra that result from the "energetically non-allowed" reactions which are due to radiative collisions. Prelininary work suggests that the basic shape (see FIG. 15) of the emission spectra in the vicinity of the spontaneous emission lines that are due to radiative collisions are characteristic of those due to radiative collisions and might act as "fingerprints" for radiation that is a result of radiative collisions. This is not of central importance to the current work in He—$N_2$ since a wealth of pertinent published data exists for nitrogen that allows pinpointing of those transitions that are accessible via radiative collisions. However, other minority gas candidates for possible future radiative collision amplifiers are not as well investigated as nitrogen and such a "fingerprinting" of transitions due to radiative collisions would be an extremely valuable experimental tool. For example, from the point of view of nuclear pumping a radiative collision laser amplifier using rare gas metastable atoms and $UF_6$ molecules as the active media has obvious advantages.

To summarize, we have disclosed a new method of stimulated emission from radiative collisions, developed a theoretical model for the helium-nitrogen system in which a theoretical radiative-collisional cross section was calculated, and reported an indirect measurement of this cross section from observation of the spontaneous emission associated with reaction (7). These last measurements were done both in a low pressure flowing afterglow and in a high pressure electron-beam initiated static afterglow. The theoretical and measured values agree to within a factor of two.

The calculations herein are for steady state operation, but thermal properties are not taken into account. In a practical case, continuous operation poses problems of energy dissipation, so the pumping source will be considered to be a short to long pulse pumping device. The two pumping devices represented in the calculations are electron beam and nuclear pumping. The electron beam advice has a cell designed such that one side is a thin foil through which an energetic beam of electrons can enter the gas. Once inside the gas, the electrons undergo energetic electron impact ionization collisions, which, in turn, produce more energetic electrons capable of more ionization and excitation collisions. The thickness of the cell depends on the range of the electrons in the gas. In general, it need not be thicker than the distance over which energy can be deposited in the gas. The length of the cell depends on the design of the electron beam machine and the length of the transmission foil. The numbers of electron beam machines and cells depend on the desired amplification. Note that this is a surface source of energy (i.e. the electrons all travel normal to the surface of the foil).

The nuclear pumped laser can utilize a source of thermalized neutrons such as a reactor. These neutrons are permitted to enter the plasma and, if the helium in the He—$N_2$ mixture has a large percentage of the isotope $^3$He, a fission reaction can occur producing energetic fission products. The resulting particles, being energetic (about 1 MeV), can cause ionization, producing energetic product electrons which themselves can produce additional ionization. Thus the main excitation of the gas mixture is very similar to that of the electron beam machine, where, as described above, energetic electrons cause the excitation. In the case of the $^3$He iosotope, there are two main differences between nuclear and electron beam pumping. First, the range of neutrons in a gas is so large that the naissant electrons appear to come from a volume souce, where in the electron beam the electrons come from the foil surface. Hence, the nuclear pumped source can provide a much larger volume of plasma as an amplifying medium. Second, in general, the energy deposition in a nuclear pumped plasma is somewhat less than in the electron beam pumped plasma. The calculations include depositions for both of these cases.

Any other convenient type of pumping mechanism may also be used; for example, electric discharge (such as transverse electric atmospheric (TEA) pumping, photon pumping, thermal pumping (as with a gasdynamic laser), and chemical pumping.

The laser medium is a plasma which can be produced from a variety of energy pumping sources. The plasma parameters must be controlled such that a large density of helium atoms in the metastable ($2^3S$) state is available for interaction with nitrogen through radiative collisions. We have found that in the He—$N_2$ mixture the wavelengths at 3538Å and 3532Å provide stimulation of radiative collisions, which in turn produce highly excited Rydberg states that are autoionizing. The autoionization times are of the order of $10^{-10}$ second. This, in effect, is a self-destruction process for one of the product states of the radiative collision. This process insures the product state inversion as mentioned above. The utilization of this phenomenon to insure gain and, hence, laser amplification, is an important features of this invention.

Any laser (e.g. a dye laser) that can produce radiation at 3538Å or 3532Å may be usable as a source of radiation to be amplified. Because the radiative collision laser amplifier is most efficient at high power densities, it is desireable to start with a laser oscillator with a high power density but a small cross sectional area. Effectively, the radiative collision amplifier can amplify the cross-sectional area, maintaining a relatively constant power density. The nuclear pumping is particularly attractive in this respect because of the volume source of energy deposition and the large cross sectional areas available.

Reflective optics can be utilized to provide the type of beam desired for the application, e.g. the large cross-sectional area output beam of say a megawatt per cm$^2$ can be focused to power densities many times greater. The output modification depends on the application of the laser.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

References

1. L. I. Gudzenko and S. I. Yakovlenko, Soviet Physics JETP, 35, 877(1972).
2. S. E. Harris, J. F. Young, W. R. Green, R. W. Falcone, J. Lukasik, J. C. White, J. R. Willison, M. D. Wright, and G. A. Zdasuik, Proceedings of LASER Spectroscopy IV, June 1979.
3. W. R. Green, M. D. Wright, J. Lukasik, J. F. Young, and S. E. Harris, Optics Letters, 4, 265(1979).
4. S. E. Harris and J. F. Young, Research Studies on Radiative Collision LASERs, Final Technical Report RADC-TR-80-172, U.S. Air Force Contract No. F19628-77-C-0072. (NTIS).
5. J. C. White, Optics, Letters, 5, 199(1980).
6. J.-L. Delcroix, C. M. Ferreira, and A. Ricard, *Principles of LASER Plasmas*, ed. G. Bekefi (John Wiley and Sons, New York 1976).
7. R. W. Nicholls, Journal of Research of the National Bureau of Standards, 65A, 451(1961).
8. S. E. Harris and J. C. White, IEEE J. Quantum Electron., QE-13, 972(1977).
9. A. V. Phelps and J. P. Molnar, Phys, Rev., 89, 1202(1953).
10. D. K. Bohme, N. G. Adams, M. Moseman, D. B. Dunkin, and E. E. Ferguson, J. Chem. Phys., 52, 5094(1976).
11. A. V. Phelps and S. C. Brown, Phys. Rev., 86, 102(1952).
12. R. Deloche, P. Monchicourt, M. Cheret, and F. Lambert, Phys. Rev. A, 13, 2(1976).
13. F. W. Lee, C. B. Collins, and R. A. Waller, J. Chem. Phys., 65, 1605(1976).
14. J. E. Deese and H. A. Hassan, AIAA Journ., 14, 1589(1976).
15. F. W. Lee and C. B. Collins, J. Chem. Phys., 65, 5189(1976).
16. G. J. Schultz and R. E. Fox, Phys Rev., 106, 1179(1957). W. E. Wells, P. Monchicourt, R. Deloche, and J. Berlande, Phys. Rev. A, 8, 381(1973).
17. A. V. Phelps, Phys. Rev., 99, 1307(1955).
18. W. H. Kasner and M. A. Biondi, Phys. Rev., A137, 317(1965). F. J. Mehr and M. A. Biondir, Phys. Rev., 181, 264(1969).
19. C. Duzy and R. S. Berry, J. Chem. Phys., 64, 2431(1976).
20. W. C. Richardson and D. W. Setser, J. Chem. Phys. 58 (1972) 1809.
21. B. D. DePaola, S. D. Marcum, H. K. Wrench, B. L. Whitten and W. E. Wells, "Estimations of electron densities and temperatures in $^3$He dominated plasmas" First International Symposium on Nuclear Induced Plasmas and Nuclear Pumped Lasers (Les Editions de Physique, May 23-25, 1978) 133.
22. T. Ueno, A. Yokoyama, S. Takao, and Y. Hatano, "De-excitation Rate Constants of He($2^3S$) by Atoms and Molecules as Studied by the Pulse Radiolysis Method", Chemical Physics 45 (1980) 261-271.
23. A. Yariv, *Quantum Electronics (John Wiley and Sons, New York,* 1975).

We claim:

1. Apparatus for providing stimulated emission of electromagnetic radiation, comprising
    means for containing a mixture including a first gas, in the X(1) state, and a second gas, in the Y(1) state;
    means for pumping the first gas to excite a high population density of its atoms or molecules from the X(1) state to the X(2) state; and
    means for injecting photons of suitable frequency into the mixture, to excite, via a three-body radiative collision of an atom or a molecule of X(2) with a molecule of Y(1) and a photon,
    a high population density of molecules of the second gas from the Y(1) state to the Y(3) state, followed by
    a substantially simultaneous return of a substantial portion of the excited first gas atoms or molecules to the X(1) state and a substantial depopulation of the Y(3) state of the second gas, causing the molecules thereof to drop to the lower energy Y(2) state,
    thereby stimulating the emission from the second gas of two photons at the same wavelength for each absorbed photon, and thus providing a total quantity of photon emission with sufficient gain for amplification of electromagnetic radiation, and finally resulting in the depopulation of the molecules in the Y(2) state by autoionization.

2. Apparatus as in claim 1, wherein the pumping means comprises external means for bringing the first gas from the X(1) state to an excited metastable state X(2).

3. Apparatus as in claim 2, wherein the external means comprises means for bombarding the gas with electrons.

4. Apparatus as in claim 3, wherein the bombarding means comprises external means for generating an electron beam and directing the beam through a thin foil window to strike the mixture.

5. Apparatus as in claim 3, wherein the bombarding means comprises means for directing neutrons to strike fissionable material to produce energetic fission product particles to strike and thereby ionize a portion of the mixture and thus to produce electrons that bombard X(1) atoms or molecules in the mixture.

6. Apparatus as in claim 2, wherein the external means comprises electric discharge, radiation, thermal, or chemical means.

7. Apparatus as in claim 1, wherein the photon injecting means comprises an external source of radiation at a frequency substantially resonant with one of the transition frequencies of the second gas.

8. Apparatus as in claim 7, wherein the external source is a laser.

9. Apparatus as in claim 7, wherein the external source is a tunable dye laser of power sufficient to produce a high density of three-body collisions.

10. Apparatus as in claim 1, wherein the first gas is helium and the second gas is nitrogen.

11. Apparatus as in claim 1, wherein the containing means comprises a resonant optical cavity for injecting some of the emitted photons back into the mixture to provide self-sustained oscillation.

12. A method of providing stimulated emission of electromagnetic radiation in a mixture including a first gas, in the X(1) state, and a second gas, in the Y(1) state, comprising
pumping the first gas to excite a high population density of its atoms or molecules from the X(1) state to the X(2) state; and
injecting photons of suitable frequency into the mixture, to excite, via a three-body radiative collision of an atom or a molecule of X(2) with a molecule of Y(1) and a photon,
a high population density of molecules of the second gas from the Y(1) state to the Y(3) state, followed by
a substantially simultaneous return of a substantial portion of the excited first gas atoms or molecules to the X(1) state and a substantial depopulation of the Y(3) state of the second gas, causing the molecules thereof to drop to the lower energy Y(2) state,
thereby stimulating the emission from the second gas of two photons at the same wavelength for each absorbed photon, and thus providing a total quantity of photon emission with sufficient gain for amplification of electromagnetic radiation, and
finally resulting in the depopulation of the molecules in the Y(2) state by autoionization.

13. A method as in claim 12, wherein the first gas comprises metastable atoms or molecules and the second gas comprises molecules with an ionization potential less than the excitation energy of the atoms or molecules of the first gas.

14. A method as in claim 12, wherein the first gas is brought from the X(1) state to an excited metastable state X(2) by external pumping.

15. A method as in claim 14, wherein the pumping comprises bombardment by electrons.

16. A method as in claim 14, wherein the X(1) state is the ground state.

17. A method as in claim 12, wherein the first gas is helium.

18. A method as in claim 17, wherein the X(1) state is $He(1^1s)$.

19. A method as in claim 18, wherein the X(2) state is $He(2^3s)$.

20. A method as in claim 12, wherein the photons are injected from an external source of radiation at a frequency substantially resonant with one of the transition frequencies of the second gas.

21. A method as in claim 20, wherein the external photon source is a laser.

22. A method as in claim 20, wherein the external photon source is a tunable dye laser of power sufficient to produce a high density of three-body collisions.

23. A method as in claim 12, wherein the second gas is nitrogen.

24. A method as in claim 23, wherein the Y(1) state is $N_2(X)$.

25. A method as in claim 24, wherein the Y(2) state is $N_2^* (X, \nu=3)$, where * denotes excitation to a Rydberg state near the ionization limit.

26. A method as in claim 25, wherein the Y(3) state is $N_2^* (B, \nu=4)$.

27. A method as in claim 12, wherein the first gas comprises a noble gas.

28. A method as in claim 12, wherein the second gas comprises nitrogen, oxygen, carbon monoxide, carbon dioxide, nitric oxide, uranium hexafluoride, or heptafluoroiodopropane.

29. A method as in claim 12, wherein the first gas is helium, neon, argon, or nitrogen.

30. A method as in claim 12, wherein the gain varies directly with the product of the population density of the atoms or molecules in the X(2) state multiplied by the population density of the molecules in the Y(1) state minus the product of the population density of the atoms or molecules in the X(1) state multiplied by the population density of the molecules in the Y(2) state.

31. A method as in claim 30, wherein the depopulation of the molecules in the Y(2) state to lower nonresonant levels by autoionization is rapid and substantially complete, so that the product of the population density of the atoms or molecules in the X(1) state multiplied by the population density of the molecules in the Y(2) state is negligible, (because [Y(2)] is approximately zero), and thus the gain is substantially proportional to the product of the population density of the atoms or molecules in the X(2) state multiplied by the population density of the molecules in the Y(1) state.

32. A method as in claim 31, wherein the autoionization is substantially complete in a time less than the radiative lifetime.

33. A method as in claim 12, wherein some of the emitted photons are injected back into the mixture in a resonant optical cavity to provide self-sustained oscillation.

* * * * *